(12) United States Patent
Soon-Shiong

(10) Patent No.: US 11,688,079 B2
(45) Date of Patent: Jun. 27, 2023

(54) DIGITAL REPRESENTATION OF MULTI-SENSOR DATA STREAM

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 17/218,331

(22) Filed: Mar. 31, 2021

(65) Prior Publication Data
US 2021/0304418 A1 Sep. 30, 2021

Related U.S. Application Data

(60) Provisional application No. 63/002,708, filed on Mar. 31, 2020.

(51) Int. Cl.
*H04N 21/234* (2011.01)
*G06T 7/246* (2017.01)
(Continued)

(52) U.S. Cl.
CPC .............. *G06T 7/246* (2017.01); *G06F 16/70* (2019.01); *G09B 19/0038* (2013.01); *H04N 7/181* (2013.01); *G06T 2207/30221* (2013.01)

(58) Field of Classification Search
CPC .......... G06T 7/246; G06T 2207/30221; G06T 19/006; G06F 16/70; G09B 19/0038; H04N 7/181; H04N 5/268; H04N 5/272; H04N 21/43072; H04N 5/232061; H04N 21/43074; H04N 21/2187; H04N 5/23238;
(Continued)

(56) References Cited

U.S. PATENT DOCUMENTS 7,689,717 B1 * 3/2010 Munshi .................. G06T 15/00
709/236
8,593,542 B2 11/2013 Steinberg et al.
(Continued)

OTHER PUBLICATIONS

Cao et al., "OpenPose: Realtime Multi-Person 2D Pose Estimation using Part Affinity Fields", Cornell University, arXiv.org/abs/1812.08008, May 30, 2019, 14 pages.
(Continued)

*Primary Examiner* — Patrick E Demosky
(74) *Attorney, Agent, or Firm* — Sheridan Ross P.C.

(57) ABSTRACT

A digital content production center and method are described. An illustrative method includes receiving object information from a plurality of different sensors, where a first sensor in the plurality of sensors provides first sensor data to describe the object information and where a second sensor in the plurality of sensors provides second sensor data to describe the object information. The method further includes determining that the first sensor data and not the second sensor data, thereby differentiating sensor data information, is to be used in connection with building an image of an object described by the object information, generating a set of prioritized data streams that include digital representations of the first sensor data and not necessarily the second sensor data, and transmitting the data streams across a communication network, according to a prioritization.

20 Claims, 9 Drawing Sheets

(51) Int. Cl.
*G09B 19/00* (2006.01)
*H04N 7/18* (2006.01)
*G06F 16/70* (2019.01)

(58) Field of Classification Search
CPC ............ H04N 5/247; H04N 21/21805; H04N 21/44016; H04N 5/232; H04N 21/816; H04N 21/4728; H04N 21/8146; H04N 5/2625; H04N 21/234; H04L 67/1091; H04L 65/607; H04L 65/604; H04L 65/4015; H04L 67/104; H04L 65/60; H04L 65/80
See application file for complete search history.

(56) References Cited

U.S. PATENT DOCUMENTS

| | | | |
|---|---|---|---|
| 9,019,349 B2 | 4/2015 | Richardson | |
| 9,235,765 B2 | 1/2016 | Bentley et al. | |
| 9,396,385 B2 | 7/2016 | Bentley et al. | |
| 10,192,365 B2 | 1/2019 | Siddiqui et al. | |
| 10,255,730 B2 | 4/2019 | Dzhurinskiy et al. | |
| 10,419,284 B2 | 9/2019 | Wittenschlaeger | |
| 10,540,772 B2 | 1/2020 | Wnuk | |
| 10,826,796 B2 | 11/2020 | Charnock et al. | |
| 2006/0136581 A1 | 6/2006 | Smith | |
| 2008/0192116 A1 | 8/2008 | Tamir et al. | |
| 2011/0196942 A1* | 8/2011 | Shukla | H04L 65/604 709/217 |
| 2011/0304706 A1 | 12/2011 | Border et al. | |
| 2012/0201426 A1 | 8/2012 | Jasinski et al. | |
| 2015/0297949 A1 | 10/2015 | Aman et al. | |
| 2016/0140956 A1 | 5/2016 | Yu et al. | |
| 2017/0094355 A1* | 3/2017 | McCarty | G06F 16/735 |
| 2018/0342106 A1* | 11/2018 | Rosado | A63F 13/60 |
| 2018/0349946 A1* | 12/2018 | Nguyen | G06Q 30/0244 |
| 2019/0268612 A1* | 8/2019 | Fukuyasu | H04N 21/4728 |
| 2019/0294918 A1 | 9/2019 | Witchey et al. | |
| 2020/0236278 A1* | 7/2020 | Yeung | H04N 5/268 |
| 2020/0302664 A1* | 9/2020 | Lee | G06T 5/20 |
| 2021/0016168 A1 | 1/2021 | Soon-Shiong et al. | |
| 2021/0201855 A1* | 7/2021 | Kammachi-Sreedhar | H04N 21/4728 |

OTHER PUBLICATIONS

"OpenPose," retrieved from github.com/CMU-Perceptual-Computing-Lab/openpose, date unknown, 8 pages.

\* cited by examiner

DIGITAL REPRESENTATION OF MULTI-SENSOR DATA STREAM

CROSS REFERENCE TO RELATED APPLICATION

The present application claims the benefit of and priority to U.S. Provisional Application No. 63/002,708, filed on Mar. 31, 2020, the entire disclosure of which is hereby incorporated by reference.

FIELD OF THE DISCLOSURE

Embodiments and technologies of the present disclosure relate to systems and methods for presenting scene and object information and for capturing object and scene information for transmission across a communication network for rendering on at least one endpoint device.

BACKGROUND

Real-time, real-world event production and broadcasting is an expensive and technically complex affair. Indeed, events like sporting events, concert events, live performances, and the like are usually filmed with a number of cameras, and the inputs from a particular camera are usually selected for transmission/broadcasting across a communication network to user devices. A limiting factor with these solutions may include the fact that a camera's stream is treated as a fundamental data unit rather than a composite of data from many sensors. This limits the amount of information that can be conveyed or presented to the consumer of the broadcast (e.g., the person viewing the event via their user device) in an efficient manner.

SUMMARY

It is with respect to the above that embodiments of the present disclosure were contemplated. In particular, embodiments of the present disclosure provide a multi-sensor solution for capturing information from a scene and for sharing the multi-sensor information with user endpoint devices across a communication network. Embodiments of the present disclosure further provide intelligence for selecting which types of sensor data to transmit across the communication network, when to transmit the selected sensor data, prioritization algorithms for selecting and prioritizing sensor data for transmission, interpolation processes for interpolating information between data received from different sensors, and other such processes. In this way, a user's experience when viewing the event is enhanced. Moreover, the amount of bandwidth consumed by the broadcast or streaming of the multi-sensor information can be efficiently utilized. Further still, by utilizing various processes described herein, the event can be broadcast in real-time or near-real-time, but enhanced information can be shared to further enhance the user's experience.

It should be appreciated that embodiments of the present disclosure are not simply limited to techniques for capturing video and audio information associated with a scene or an object and then broadcasting such video and audio information in a synchronized manner. Examples of such broadcasting techniques are described in U.S. Patent Publication No. 2015/0297949, the entire contents of which are hereby incorporated herein by reference.

Rather, embodiments of the present disclosure further contemplate receiving inputs from multiple different types of sensors (e.g., CCD, CMOS, cameras, microphones, depth sensors, etc.) and then building a composite image, video, or other types of digital data streams from the multiple different sensor inputs for broadcasting to user endpoint devices. In this way, the visualization of the scene and objects within the scene can be enhanced in several different ways based on different types of image data. For instance, data from infrared sensors, ultraviolet sensors, and traditional cameras (e.g., visible light image pickup devices, CMOS imaging devices, photodiode-based imaging devices, etc.). The visualization of the scene can also be built with sensor data from sensors other than image-based sensors. As some non-limiting examples, accelerometers, gyroscopes, magnetometers, vibration sensors, proximity sensors, piezoelectric sensors, ultrasonic sensors, position sensors, GPS devices, Bluetooth beacons, depth sensors, temperature sensors, etc. can also provide sensor data for use in building a composite image. In some embodiments, a production center that is either co-located with one or more of the sensors or that is remotely located with respect to one or more of the sensors may be used to receive all of the sensor data, determine which sensor data to use for building the composite image, video or other data stream, and determine which sensor data to broadcast along to user devices.

Embodiments of the present disclosure also contemplate the ability to receive sensor data from a plurality of different sensors of different types and then build a composite image, video, or other digital data stream based on the sensor data received from the plurality of different sensors and where the digital data streams may comprise multiple data modalities. In some embodiments, the composite image may include real-time footage captured from one or more cameras. In some embodiments, the composite image may include one or more animated models, computer-generated graphical elements, virtual objects, and the like. Such animated models, computer-generated graphical elements, virtual object, and the like may account for the entirety of visible elements in the composite image or they may supplement real-time footage captured from a camera. Examples of techniques for supplementing real-time video footage with information obtained from motion capture sensors are described in U.S. Patent Publication Nos. 2008/0192116; 2011/0304706; and 2012/0201426 and U.S. Pat. Nos. 9,019,349; 9,396,385; and 9,235,765 the entire contents of each of which, as well as all other extrinsic references, are hereby incorporated herein by reference in their entirety.

In particular, embodiments of the present disclosure provide a method that includes: receiving object information from a plurality of different sensors, where a first sensor in the plurality of sensors provides first sensor data to describe the object information and where a second sensor in the plurality of sensors provides second sensor data to describe the object information; determining, at least according to a set of rules or a policy, that the first sensor data and not the second sensor data is to be used in connection with building an image of an object described by the object information; generating a data stream that includes the first sensor data and not the second sensor data; and transmitting the data stream across a communication network to at least one user device thereby enabling the at least one user device to render the image of the object based on the first sensor data.

Further aspects of the method contemplate the first sensor comprises a first sensor type, the second sensor comprises a second sensor type, and the first sensor type is different from the second sensor type.

Further aspects of the method contemplate a third sensor in the plurality of sensors provides third sensor data to describe the object information and the method may further include determining that the third sensor data is also to be used in connection with building the image of the object described by the object information; and utilizing the third sensor data and the first sensor data to generate the data stream.

Further aspects of the method contemplate the first sensor data comprises image-based sensor data and wherein the third sensor data comprises non-image-based sensor data.

Further aspects of the method contemplate the first sensor comprises an image pickup device configured to detect visible light and where the third sensor comprises at least one of LIDAR, radar, an Infrared detector, an ultraviolet detector, a proximity detector, and a depth detector.

Further aspects of the method contemplate that the second sensor comprises at least one of a motion detector, a position detector, and an accelerometer.

Further aspects of the method may include identifying a gap between the first sensor data and the third sensor data; interpolating the first sensor data and the third sensor data to produce an interpolated presentation of one or more objects in the gap; and including the interpolated presentation of the object in the gap with the data stream.

Further aspects of the method may include: determining that the first sensor data and the second sensor data is to be used in connection with building an additional image of the object described by the object information; generating a second data stream that includes the first sensor data and the second sensor data; and transmitting the second data stream across the communication network to a user device other than the at least one user device thereby enabling the user device other than the at least one user device to render the image of the object based on the first sensor data and the second sensor data.

Further aspects of the method may include, according to a prioritization policy that depends on one or more larger number of stream attributes: determining that the data stream comprises a higher priority than the second data stream; storing the second data stream in a buffer while the data stream is transmitted; and after the data stream is transmitted, retrieving the second data stream from the buffer for transmission.

Further aspects of the method may include: identifying the object as an object of interest; differentiating the object of interest from a background object; marking the background object and a location of the background object relative to the object of interest; and updating sensor data in the data stream that describes the object of interest with a different frequency than sensor data in the data stream that describes the background object.

Yet another aspect of the inventive subject matter relates to a computer-based broadcasting system. Such systems include one or more sensors where each sense can be of a different type, thereby capturing different sensor data modalities (e.g., image data, video data, temperature data, motion data, depth data, orientation data, position data, location data, audio data, etc.). In some embodiments, the sensors are deployed within, around, or otherwise proximate to a physical, real-world environment (e.g., a stage, a sound stage, a room, a building, a street, outdoor setting, etc.). Upon execution of software instructions stored in a non-transitory computer readable memory (e.g., RAM, ROM, flash, HDD, SSD, etc.) via at least one processor, the processor performs one or more operations associated with forming the sensor data into one or more broadcasts. The operations include, for example, obtaining a set of sensor from the set of sensors (i.e., one or more sensors) disposed about the physical environment. The operations can further include compiling a set of digital sensor streams from the sensor data according to a prioritization policy. The digital sensor data streams can be aligned directly, on a one-to-one basis, with each sensor or each sensor modality. Additionally or alternatively, the digital data streams can comprise data from or derived from multiple sensors or sensor data modalities. The prioritization policy provides instructions or directives on how each of the digital data streams should be prepared relative to each other. Said another way, the prioritization policy determines which stream should be prioritized over other streams with respect to a desired action (e.g., rendering, transmission, compiling, latency, number of hops, etc.). Each of the digital data streams preferably corresponds to one or more layers of renderable content to be rendered on a computing endpoint device. The operations can further comprise transmitting the set of digital data streams over a network (e.g., Internet, intranet, WAN, PAN, cellular network, etc.) to one or more endpoint devices where the transmission of each data stream is conducted according to the prioritization policy. Each data stream enables the receiving endpoint devices to render corresponding layers of renderable content based on the prioritized layer rendering instructions from the prioritization policy. This approach gives rise to the ability of a broadcast system to decompose an observed or captured event (e.g., a concert, live performance, etc.) into prioritized layered streams, which can then be efficiently broadcast to remote users. The layered streams can also be efficiently rendered for the users in an optimized fashion for a solid user experience in view of the technical limitations of the network or the user's endpoint device.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably. Also, as used in the description herein, the meaning of "in" includes "in" and "on" unless the context clearly dictates otherwise.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Figure 1:
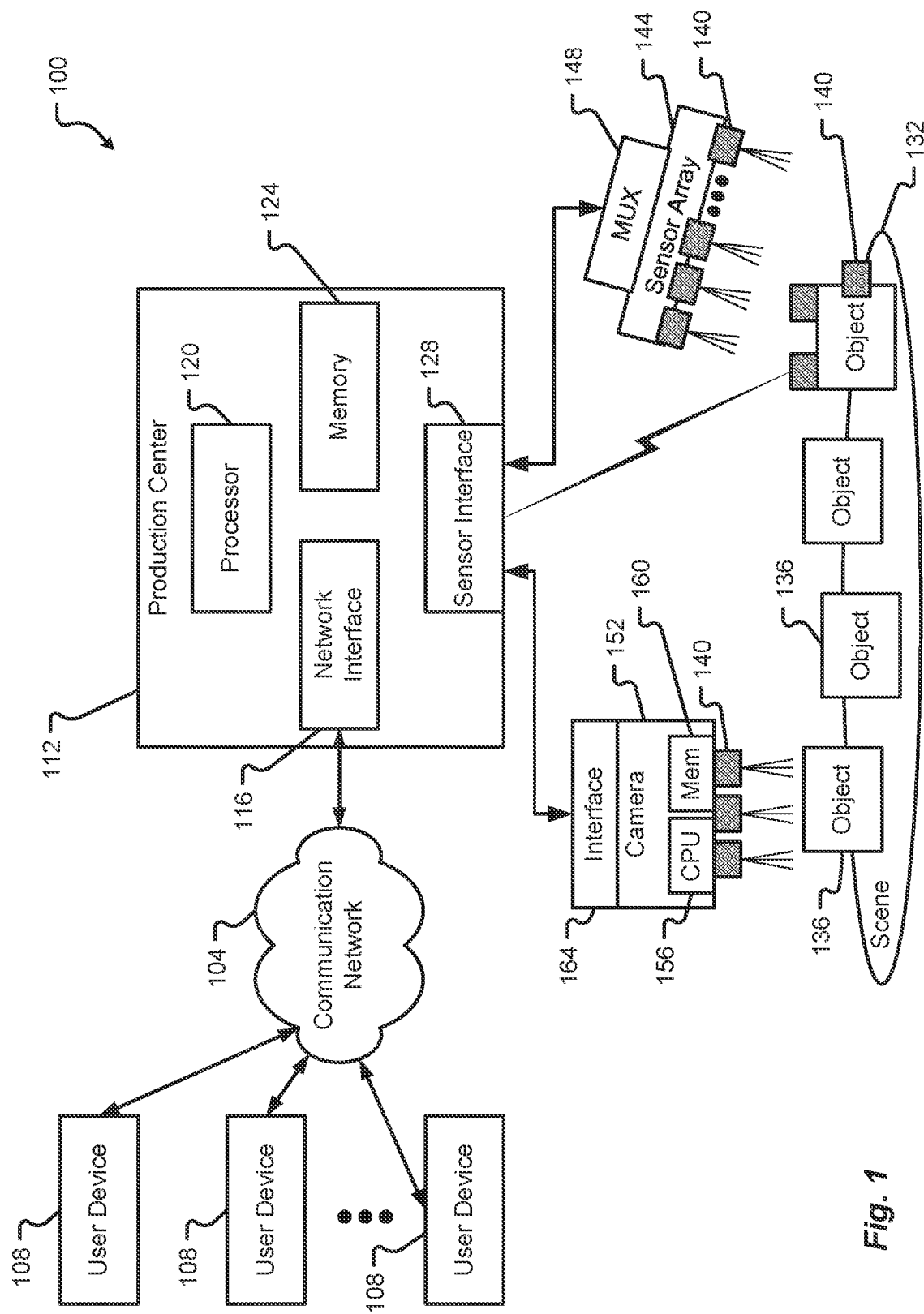
FIG. 1 is a block diagram depicting a system in accordance with at least some embodiments of the present disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

An overview of the disclosed technologies and techniques will be useful in understanding the context of the following discussion. In the age of streaming content, there continues to be a growing desire for more engaging content. Streamed content is still limited by the bandwidth of networks, capabilities of endpoint devices, corresponding software (e.g., browsers, games, apps, etc.), or other technical limitations. In an effort to create more engaging content, the inventors have appreciated that live events could be captured by multiple sensors (e.g., cameras, etc.) from many different perspectives to create, in a real sense, a nearly complete 4D+ digital representation of the event. However, even in view of compression techniques, the inventors have further appreciated that the resulting sensor data used to create a more fully engaging streamed experience can overwhelm the network or endpoint devices' rendering capabilities. Such limitations are further exacerbated when there are multiple live events to be streamed or when the system must broadcast to a myriad of endpoint devices. Thus, the inventors have realized such technical limitations can be overcome, at least according to one or more aspects of the inventive subject matter, by coupling prioritized data streams with prioritized layering of renderable content via a prioritization policy. For example, the sensor data from many sensors can be compiled down into individual digital data streams where each stream is prioritized and further can comprise layered rendering instructions. The streams can then be broadcast, individually or collectively, to endpoint devices according to their prioritizations thereby addressing network limitations. Still further, the endpoint devices upon receiving the digital data streams can render the streams' corresponding renderable content layer by layer, again according to one or more determined prioritizations. This approach allows the endpoint devices to reassemble a rendering of the observed event from one or more perspectives in an efficient, fluid manner acceptable to the user given the limitations of their device or the network to which they are communicatively attached. In general, the priorities set for the compilation or management of the digital data streams could be the same priorities for rendering the corresponding layers of renderable content. However, it is also possible the priorities of the digital data streams could different from the priorities for rendering.

Consider a use case where a live event, say a concert, is broadcast to remote devices such as smart phones. In a basic embodiment, the concert can be captured by many cameras from numerous point-of-views (PoVs). The camera data can be broken down into various streaming layers. For example, one stream might contain a 3D wireframe model of the musicians, a second stream might contain observed textures (i.e., graphic textures) of the musicians, a third stream might contain a 3D model of the stage that updates infrequently because the stage is, for the most part, static. These streams can be prioritized accordingly: the first stream might be the highest priority because it would likely comprise a low bandwidth stream yet provide a fluid rendering on a user's device, the second stream might be mid priority because it would consume more bandwidth and such textures might not change frequently, and the third stream might be lowest priority simply because a background stage might not need frequent updates at all.

Keep in mind that the event is "4D+" in that the user has access to a 3D model of the event from the streams, and the user could change their viewing perspective as desired. The term "4D+" is intended to indicate the event can include at least three spatial dimensions and at least one time dimension thereby forming at least a four dimensional (4D) digital or virtual event. Additional dimensions are contemplated to represent other data modalities possibly including one or more of the following: depth data, temperature data, location data, orientation data, acceleration data, or other data modalities. Thus, the "+" in "4D+" references the event can include additional dimensions of relevant or data beyond the traditional four dimensions.

Embodiments of the present disclosure are generally contemplated to enable the capturing of data that describes or represents a scene with one or more sensors comprising a number of different sensor types, producing one or more digital data streams that include data from one, some, or all of the different sensor types, transmitting the data streams to at least one receiving endpoint device, and enabling the receiving device to render a presentation or representation of objects from the scene based on the different types of data incorporated in the data streams. In some embodiments, each data stream can correspond to or comprise one or more layers of renderable content. As a first non-limiting example, reconsider the previous concert that is being broadcast to a number of viewers. Certain viewers may wish to view the concert according to a first subscription level whereas other viewers may wish to view the concert according to a second subscription level that is different from the first. In this situation, the viewers that view the concert according to the first subscription level may have enhanced services provided thereto as compared to other viewers. These enhanced services may include reduced latency, improved data accuracy, interpolation services, virtualization services, etc. More specifically, viewers that view the concert according to the first subscription level may receive one or more data stream representing a layer of renderable content that includes image data, LIDAR data, IR data, audio data, virtualization data, etc. that enables rendering of a digital reproduction of the concert that includes some or all of the data. Continuing with the concert example, the reproduction according to the first subscription level may include reduced latency by having the background and in-person audience of the concert blurred or not updated as often as objects (e.g., the lead singer, the band, live props, etc.) that are in the foreground. The reproduction may also include the ability for the user to view the concert in different ways (e.g., by applying various types of filters, selecting a new PoV, etc.). For instance, the concert may be viewed with IR or temperature data rather than RGB or HSV data. Alternatively, virtualizations of costumes, clothing, and the like may be provided to the viewers that view the content at the first subscription level. Other viewers may not have the reduced latency features, additional data features, or other features as described herein. Furthermore, the data streams transmitted to viewers at the first subscription level may be transmitted without being held in a data buffer for more than a predetermined amount of time (e.g., 20 seconds) whereas the data stream transmitted to other viewers may be buffered for at least the predetermined amount of time before being transmitted.

In another example, embodiments of the present disclosure may be utilized in the field of remote/robotic surgery. In such a scenario, data from a patient may be gathered and transmitted in a one or more composite data streams to a remotely located surgeon that is remotely controlling a surgical robot at the patient's surgery site. The composite data stream may include data from a number of sensors (e.g., image sensors, LIDAR sensors, IR sensors, audio sensors, thermal sensors, PulseOx sensors, galvanic sensors, etc.). Because accuracy of such data may be of a higher importance than latency, some of the data from some sensors may be collected or compiled and transmitted in the composite data stream that is received at the surgeon's location, thereby enabling an accurate reproduction of the surgical facility and the patient. Furthermore, because the area of interest may be relatively focused for the remotely located surgeon, the ability to focus each of the different sensors on a common area (rather than trying to capture data from a large concert stage) may help to create an accurate presentation of data to the surgeon. Such an approach provides for a real-time adjustment of which sensor feeds are compiled into the composite sensor data stream. Such data may include the data from one, some, or all of the sensors at the patient site. Thus, the surgeon will receive high accuracy, low latency data according to a higher priority (e.g., tissue data, biometrics, scalpel position, etc.) than other data streams (e.g., operating room background, voice chatter, etc.). Example techniques for identifying tissue data based on multiple sensor modalities can be found in U.S. 2019/0294918 titled "Volumetric Descriptors", filed Mar. 20, 2019, herein incorporated by reference in its entirety.

With reference to FIG. 1, an illustrative system 100 will be described in accordance with at least some embodiments of the present disclosure. The system 100, in some embodiments, may include one or more computing devices operating in cooperation with one another to provide sensor data collection and distribution data processing functions. The components of the system 100 may be utilized to facilitate one, some, or all of the methods described herein or portions thereof without departing from the scope of the present disclosure. Furthermore, although particular components are depicted as including particular hardware or instructions, it should be appreciated that embodiments of the present disclosure are not so limited. For instance, a plurality of servers may be provided with certain instructions depicted and described in the production center of FIG. 1. Further, one should appreciate that the disclosed inventive subject matter can be implemented using various hardware or software combinations. In some embodiments, the ecosystem can include cloud-base servers, suitably enabled client devices, individual servers, peer devices, virtual machines, software products, software product suites, or other combinations of devices thereby forming a computing platform on which various embodiments can be implemented. For example, in some embodiments, the inventive subject matter can include one or more of production center 112 computers executing a suite of software packages to collect sensor data and compile one or more prioritized digital data streams. Further, user endpoint devices 108 (e.g., cell phones, etc.) can also include software executing on the endpoint device processors that cooperate or otherwise interact with the production center 112 software suite. One should appreciate that a suite of software packages or products is considered to include multiple, possibly distinct, software products that work together but could be deployed on more than one distinct computing device (e.g., server software and client software, master/slave software, peer-to-peer software, etc.).

The system 100 is shown to include a communication network 104 that facilitates machine-to-machine communications between a production center 112 and/or one or more user devices 108. The production center 112 may be implemented as a server, but it should be appreciated that any type of server or collection of servers (e.g., cloud devices, peers, distributed computers, etc.) may be provided to implement the functionality or structure described in connection with the illustrative production center 112.

The communication network 104 may comprise any type of known communication medium, or yet to be deployed, or collection of communication media and may use any type of suitable protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network (e.g., 3G, 4G, 5G, etc.), and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The user device 108 may correspond to any type of computing resource that includes a processor, computer memory, and a user interface collectively operating as an endpoint device. As can be appreciated, the user device 108 may also include one or more network interfaces that connect the user device 108 to the communication network 104 and enable the user device 108 to send/receive packets via the communication network 104. Alternatively or additionally, a modem, a router, a switch, an access point, a set top box, or other interconnectivity device may be provided between the user device 108 and the communication network 104. Non-limiting examples of a user device 108 include personal computers, laptops, mobile phones, smart phones, tablets, wearable devices, televisions, electronic toys, appliances, set top boxes, vehicles, kiosks, vending machines, game consoles, etc. In some embodiments, the user device 108 is configured to be used by and/or carried by a user. One should appreciate that different use-cases would likely have different types of user endpoint devices 108. For example, in a movie studio production system, user endpoint devices 108 would likely be traditional desktop computers where production stakeholders can interact fully with the digital data streams via dedicated production software (e.g., game engines, studio software, etc.). In other cases, such as a live stream of a concert, user endpoint devices 108 might include a mix of browser-enable computers and smart phones. Still further, live streaming events related to outdoor gaming might employ a large number of smart phones as user endpoint devices 108 where the users are also players of a game. All practical variations or combinations of user endpoint devices 108 are considered to fall within scope of the inventive subject matter.

The production center 112 may be configured to execute, via one or more computing devices, one or multiple different types of software instructions stored in one or more non-transitory computer readable memories (e.g., flash, RAM, HDDs, ROMs, SSDs, etc.) in connection with receiving, processing, and distributing digital content to one or more of user devices 108. Additional details of such instructions will be described in connection with FIG. 2. It should be appreciated that the production center 112 may include one or many different types of computer hardware used for the purposes of receiving sensor data, processing sensor data, building a composite image, video, or other digital data stream for distribution across the communication network 104, and broadcasting the composite image(s) across the communication network 104. The production center 112 is shown to include a network interface 116, a processor 120 (e.g., CPU, GPU, multi-core processor, FPGS, ASIC, PLA, etc.), and memory 124. These hardware resources of the production center 112 may enable functionality of the production center 112 as will be described herein. For instance, the network interface 116 provides the production center 112 with the ability to send and receive communication packets over the communication network 104. The network interface 116 may be provided as a network interface card (NIC), a network port, drivers for the same, and the like. Communications between the components of the production center 112 and other devices connected to the communication network 104 may all flow through the network interface 116.

Production center 112 can take on many different forms depending on the nature of an implementation of the inventive subject matter. In some embodiments, production center 112 represents one or more dedicated computers operating to monitor scene 132. For example, production center 112 could include a computer under control of a movie director or other stakeholder while filming movie scenes in a closed physical environment such as a sound stage. As one or more of camera 152 or sensor array 144 collect data associated with scene 132, production center 112 aggregates the sensor data and compiles one or more digital data streams that can be transmitted to the various stakeholders (e.g., producers, editors, directors, etc.) who can then use their own user devices to engage with the content. In such use case, it is contemplated the compiled digital data streams would likely be encrypted (e.g., using SSL, HTTPS, AES, SSH, 3DES, VPN, ECC, etc.) or transmitted within a closed, secure network.

In some embodiments, production center 112 might be one or more computers working together to support a live broadcast; a concert as previously mentioned, for example. In such a case, production center 112 might be a cloud-based distribution computer where producers of the concert curate the sensor feeds. End users, subject to authentication or subscription levels, can receive one or more streams of digital data. In a somewhat similar vein, production center 112 could also be an aggregation web site where sensor feeds are aggregated. Users of the site, in exchange for a fee, could define how the sensor feeds are compiled into the digital data streams or which features of the sensor data would be best rendered on their person user endpoint device 108.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), multi-core CPU, Graphics Processing Unit (GPU), Tensor Processing Unit (TPU), or plurality of microprocessors that are configured to execute the instructions sets stored in memory 124. One should appreciate that a processor could also comprise one or more cores capable of executing software instructions in parallel. Upon executing the instruction sets stored in memory 124, the processor 120 enables various functions of the production center 112. In heavy graphics rendering applications (e.g., motion capture, movies, gaming, etc.), GPUs would figure more heavily to create pre-rendered models. However, in application requiring more security an ASIC or GPU might be employed where the ASIC or GPU is dedicated to providing crypto services.

The memory 124 may include any type of computer memory device or collection of computer memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instructions depicted in addition to temporarily storing data for the processor 120 to execute various types of routines or functions. Although not depicted, the memory 124 may include instructions that enable the processor 120 to store or retrieve data from one or more databases (e.g., indexed data structures, lookup tables, file systems, SQL, NoSQL, MongoDB, etc.) used to receive and process sensor data. Further still, the memory 124 may include instructions that enable the production center 112 to distribute content to user devices 108 via the communication network 104.

The production center 112 is further depicted to include a sensor interface 128. The sensor interface may include one or many serial or parallel data ports that are configured to receive data from various sensors 140 distributed around or within a scene 132 (e.g., USB, Bluetooth, 802.11, RS-232, RS-485, Zigbee, I2C, SPI, AtoD, DtoA, analog interfaces, etc.). In some embodiments, the sensor interface 128 may be configured to receive sensor data from a plurality of different sensors 140, which may be the same or different sensor types. The sensor data may be received via a wired connection and/or wireless connection, depending upon the nature of the sensor 140 providing the sensor data. Thus, it should be appreciated that the sensor interface 128 may include one or more physical ports for establishing a wired connection as well as one or more antennas for establishing a wireless connection.

The scene 132 is depicted to include a number of objects 136 that are being monitored, observed, tracked, or otherwise digitally captured by the various sensors 140 distributed around the scene 132. In some embodiments, the sensors 140 may provide data to the production center 112 where a representation of the scene 132 and the objects 136 therein are built into a one or more of a composite digital image or a digital model for distribution across the communication network 104. Non-limiting examples of a scene 132 include a sports field, a stage, a studio, a movie studio, a classroom, or any other setting in which an event is held or objects are observed. It should also be appreciated that the nature of the objects 136 may depend upon the nature of the scene 132. Non-limiting examples of objects 136 may include sports participants, actors, producers, directors, commentators, spectators in attendance of the sporting event, animals, inanimate objects involved in the event (e.g., ball, puck, boundaries, etc.), race cars, props being used in the event, background objects, puppets, virtual or augmented reality objects, a patient, body parts, robots, etc. Additional features of scene 132 can also include smart devices. For example, in some use cases, scene 132 can comprises one or more display (e.g., large LED walls used as backdrops in movie production, televisions, monitors, etc.) that display content that in turn is captured by the sensors. Still further, objects in scene 132 can include one or more controllable smart devices (e.g. robots, cameras, toys, etc.) capable of coordinating actions with production center 112 or other computing devices.

Sensors 140 distributed around the scene 132 may capture various types of information about the scene 132 and objects 136. For instance, image-based sensors may capture image sensor data (e.g., pictures, motion pictures, video images, still pictures, heat maps, biometric data, etc.) and share the image sensor data with the production center 112 via the sensor interface 128. Such image-based sensors may be provided on a camera 152 or as part of a sensor array 144. Alternatively or additionally, the camera 152 and/or sensor array 144 may include a number of other sensor types such as proximity sensors, LIDAR sensors, volumetric sensors, UV sensors, IR sensors, radars, Doppler, inertial sensors, machine vision devices, Augmented Reality (AR) sensors, laser sensors, depth sensors, etc. In some embodiments, sensors 140 may be provided on or attached to an object 136. Examples of such sensors include Bluetooth sensors, RFID sensors, proximity sensors, beacons, material sensors, accelerometers, inertial sensors, GPS devices, magnetometers, fabric-based sensors, and the like. More specific examples of such sensors include, without limitation, 600-1000 nm lasers, Flash lidar cameras, phased array lidar sensors, Vu8 Lidar Sensor from LeddarTech, HDL-32E LiDAR sensor, Velodyne's LiDAR's Puck LITE™, Intel® RealSense™ Depth and Tracking camera, motion capture sensors from XSENS™, OptiTrack Prime Color FS, and the like. Such sensors may transmit sensor data directly to the production center 112 via the sensor interface 128 or may provide their sensor data to an intermediate device, such as camera 152 or sensor array 144.

The camera 152 is shown to include multiple sensors 140, which may or may not be of the same type, which can capture one or more modalities of data (e.g., image, video, audio, temperature, textures, depth, galvanic response, etc.). The camera 152 is also shown to include a CPU 156 and memory 160. The CPU 156 may be similar to processor 120 and memory 160 may be similar to memory 124. The camera 152 may also include an interface 164 that facilitates wired or wireless communications with the sensor interface 128 of the production center 112. In some embodiments, the interface 164 may include cabling, fiber optics, wireless transmitters, etc. that are capable of communicating data from the camera's 152 sensors 140 to the sensor interface 128. Such communications may occur in serial or parallel data transmissions, which may be encoded according to one or more data modalities; for example, any type of video, image, audio, or other type of encoding standard or protocol.

One or more sensors 140 may alternatively or additionally be provided on a sensor array 144, which includes a multiplexer 148 to multiplex the data received from various sensors 140 onto a common or single communication channel. The multiplexer 148 may include an encoder or the like for encoding the sensor data prior to transmitting the sensor data to the sensor interface 128. For example, in some embodiments, multiplexer 148 could be embodied by a USB hub that provides connectivity to multiple USB-enabled sensors. MUX 148 may also be configured to be sensitive to the prioritization of sensor data streams or subscription levels to ensure data from individual sensors are received and processed accordingly. For example, the MUX can be used to selected image-based sensor data when images are a prioritized data stream or renderable layer of content based on the instructions within the prioritization policy. Each use case (e.g., live event broadcasting, live game streaming, movie studio production, telemedicine, etc.) would likely have differing priorities that impact the behavior of MUX 148.

Figure 2:
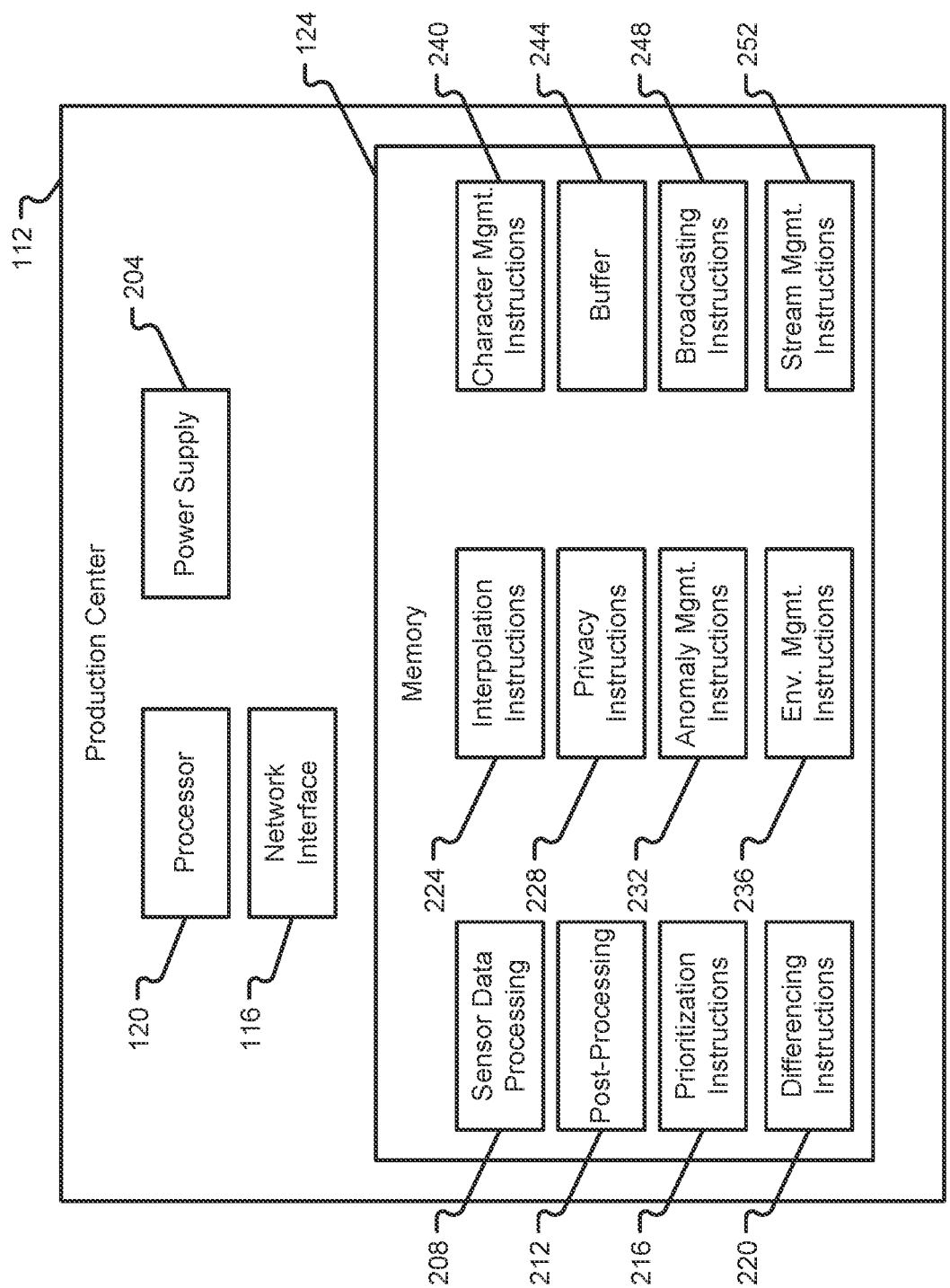
FIG. 2 is a block diagram depicting a production center in accordance with at least some embodiments of the present disclosure.

With reference now to FIG. 2, additional details of the production center 112 (i.e., one or more computing devices working together) will be described in accordance with at least some embodiments of the present disclosure. The production center 112 is further shown to include a power supply 204, which may be used to provide electrical power to some or all components of the production center 112. The power supply 204 may correspond to an Uninterruptable Power Supply (UPS), a battery, a capacitor, a power transformer, a power converter, or any other device capable of conditioning power for use by other components of the production center 112.

FIG. 2 further illustrates the various instructions that may be stored in memory 124. It should be appreciated that the instructions stored in memory 124 may be executable by at least one or more of processor 120 and, when executed, provide structure that enable the production center 112 to perform or otherwise execute the various processes and methods depicted and described herein. While particular instructions are depicted as being separate from one another, it should be appreciated that various instructions may be combined into larger instructions or instruction sets, which are capable of being executed by processor 120 either individually or in combination with one another. The instruction can be encoded in one or more programing languages possibly including low level languages (e.g., assembly language, microcode, byte-codes, etc.), compileable languages (e.g., C, Pascal, C++, C#, Java, etc.), or even scripting languages (e.g., Python, JavaScript, Cobra, Lua, etc.). Further, the instructions can execute within one or more virtual machines (e.g., VMWare, Hyper-V, etc.), containers (e.g. Docker, Kubernetes, etc.), or other execution environments. While the disclosed systems or apparatus are presented with respect to processors, memory, software, or other individual elements, one should appreciate the devices, alone or collectively, can operate as a computing platform. Thus, the inventive subject matter from a platform perspective can comprise structure including software individually or hardware individually, or a combination of both. For example, the inventive subject matter can be embodied as a single piece of software, a suite of software applications, dedicated hardware, general purpose hardware, client systems, server systems, could-based systems, or other types of platforms working alone or collectively to give rise to embodiments or implementations of the inventive subject matter.

The illustrative instructions that may be stored in memory 124 include, without limitation, sensor data processing instructions 208, post-processing instructions 212, prioritization instructions 216, differencing instructions 220, interpolation instructions 224, privacy instructions 228, anomaly management instructions 232, environment management instructions 236, object management instructions 240, broadcasting instructions 248, and stream management instructions 252. The memory 124 is also shown to include buffer memory 244, which may correspond to a particular memory device, which can be separate from the memory device used to store the instructions. Alternatively or additionally, one or more of buffer 244 may correspond to a set of memory locations that are used by the processor 120 when executing certain instructions (e.g., broadcasting instructions 248, stream management instructions 252, etc.). For a sensor-rich embodiment where sensor data or stream data is I/O bound, buffer 244 could be implemented a separate memory device (e.g., HDD, SSD, RAM storage, etc.) that buffers incoming data in preparation for processing. In such cases, the data can be buffered in a FIFO type of queue. Still is should be appreciated that other forms of queue might also be applicable (e.g., FILO, stacks, circular queues, etc.). Should the buffer near capacity, buffer 244 can provide a feedback signal (e.g., call an API, set a memory value, toggle a register, generate an electrical signal on a wire, etc.) to cooperating devices. In response to the feedback signal, production center 112 could take one or more actions. One action could include halting acquisition of sensor data from one or more sensors. Another action could include prioritizing processing of data in buffer 244 over other tasks, possibly according to instructions in the prioritization policy. Still another possible action can include overwriting older data in buffer 244, possibly via a circular queue in order to use less computer memory.

One should appreciate some or all of the instruction sets stored in memory 124 operate under one or more policies (e.g., rules, algorithms, guidelines, etc.) that aid in governing broadcasting to endpoint devices. The policies aid in providing structured interfaces among the various instruction sets through which sensor data flows from capture toward broadcasting and then eventually rendering. A preferred policy includes a prioritization policy that provides processor 120 with information on how to construct one or more digital data streams in a manner that is efficient for consumption by many endpoint devices. The prioritization policy can include one or more parameters determining the nature of other digital data streams. Example parameters include type of data streams, data modalities of the data stream, priority on transmission relative to other data streams, required latencies, required bandwidths, level or terms of service requirements, casting requirements (e.g., broadcast, multicast, unicast, etc.), or other data stream characterizations. The prioritization policy can be structured as a defined workflow through with the sensor data flows toward broadcast and on toward rendering. Each stage in along the workflow operates to move data from a stage (e.g., sensor data processing) to the next stage (e.g., post-processing). The stages can be represented by one or more object classes (i.e., object oriented programming classes) that provide APIs as interfaces between the set of instructions. Further, one should appreciate the prioritization policy can be thought of binding the priorities of the digital data streams to how the streams' content should be rendered in a layered fashion as will be discussed further below. The prioritization policy can be implemented as a compiled program, a script, a serialized file (e.g., XML, JSON, YAML, etc.), or other programmatic format that can be processed by processor 120. A prioritization policy could be constructed as a matrix (e.g., a table, etc.) where one axis represents layers of renderable content and a second axis represents digital data stream compilation workflow stages. Each cell in the matrix can include a priority for the joint layer of renderable content and corresponding compilation stage. One should appreciate the prioritization policy matrix could comprises more than two dimensions to provide coverage for other system characteristic (e.g., sensor input dimension, etc.). Beyond prioritization policies, other types of policies can also aid in managing the sensor data to broadcast workflow. Additional policies include permission policies, security policies, or advertiser policies just to name a few.

The sensor data processing instructions 208, when executed by the processor 120, may enable the production center 112 to receive some or all of the various sensor data at the sensor interface 128 and then condition the sensor data for processing by other instructions. For instance, the sensor data processing instructions 208 may be configured to receive various types or modalities of sensor data, organize or categorize the types of sensor data according to one or more stream processing rules, determine which sensor data will be used to generate a composite image, video, model, or other digital data stream of the scene 132, convert sensor data into other types of data or information that are understandable or capable of being processed by the processor 120, store certain sensor data for later use, determine whether particular sensor data can be discarded or ignored (e.g., to conserve memory 124 utilization, etc.), and so on. It should be appreciated that any sensor data received at the sensor interface 128 may initially pass through and be processed by the sensor data processing instructions prior to other instructions in the workflow.

As discussed previously, a set of sensor data is obtained from the set of sensors, the set of sensor data can be buffered in memory 124 as necessary and depending on the requirements of the sensor itself or its corresponding drivers. For example, the set of sensor data might be stored in blocks, time series data, sensor streams, or other forms. Sensor data processing 208 provides instructions for preparing the raw sensor data for further downstream manipulation. In some embodiments, the raw sensor data might be compiled into one or more digital data streams as a layer of renderable content. In such cases, the raw sensor data might be processed via one or more endpoint devices rather than or in addition to processing center 112. Low bandwidth data or low data rate data, such as raw audio data or raw text data, would be amendable to client-side rendering, for example. However, more complex sensor data (e.g., depth data, point-cloud data, motion capture data, etc.) might require additional processing or packaging before compiling into a corresponding digital data stream. Still further, in some embodiments, the raw sensor data could be shunted off for archival or long-term storage possibly on an external storage device (e.g., flash, NAS, SAN, RAID, cloud storage, HDD, Blu-ray, CD, etc.). Archiving raw sensor data of an event provides for allowing one or more computer systems to create new versions of the event, remaster a broadcast event at a later time using improved or different techniques, or possibly form a training dataset for AI systems (e.g., train artificial neural networks (ANNs) on live movements of specific artists, etc.), among other uses.

The prioritization policy may provide input to post processing instructions 212 regarding which sensor data to be used for continued processor, how sensor data is to be prioritized for processing, or other types of input. The post-processing instructions 212, when executed by the processor 120, may enable the production center 112 to execute any number of post-processing edits, touch-ups, renderings, adjustments, or other changes to a composite image or to sensor data prior to transmitting the sensor data as a data stream across the communication network 104. It should be appreciated that each post-processing tasks can be implemented by one or more computer-coded agents (e.g., programs, routines, functions, classes, applications, etc.) and/or by an artificial neural network (e.g., a machine learning model, etc.). The post-processing instructions 212 may be responsive to inputs from other instructions stored in memory 124 or remote endpoint devices, including being responsive to directives from the prioritization policy. For instance, the post-processing instructions 212 may be configured to apply obfuscations to certain objects 136 in the scene 132 based on outputs of the privacy instructions 228 (e.g., to protect a privacy of a person or object in the scene 132). This can be achieved by using implementations of recognition algorithms (e.g., available from OpenCV, etc.) to identify object features (e.g., faces, bar codes, movie props, advertisements, etc.) that should be obfuscated. As another example, the post-processing instructions 212 may be configured to generate one or more digital models or adjust a display of renderable models based on outputs of the object management instructions 240. The post-processing instructions 212 may be responsible for finalizing the presentation of sensor data prior to the sensor data being transmitted across the communication network 104 and/or prior to generating one or more data streams based on the sensor data. Example object detection algorithms include Viola Jones face detection, Haar Feature detection, SIFT, FAST, HOG, YOLO, R-CNN, Canny edge detection, LoG, DoG, Hough transforms, and so on, or other algorithms yet to be invented.

Based on the directives within prioritization policy, post-processing instructions 212 compiles the set of sensor data into one or more compilations in preparation for creating broadcast digital data streams. The compilations depend on the desired goal of the event broadcast; however, a non-limiting example embodiment will provide insight into how compilation can be created. Consider the live concert event broadcast previously discussed. The concert might have multiple goals for content that can be encoded within the prioritization policy. The goals might include broadcasting the following: real-time wireframe models of the musicians, observed textures on and about the stage, stage background models, and a set of predetermined or a priori points of view (PoV) that endpoint devices can access. Each of the goals in this example represent a layer of renderable content where each layer is prioritized according to the directives of the prioritization policy where the wireframe models are given highest priority, textures medium priority, and the stage background low priority. The predetermined PoV might have a variable priority depending on the number of endpoint devices that subscribe to each PoV. Note that the renderable content for each goal's compilations might be generated based on the PoVs. Given these priorities, post-processing instructions can create the compilations according to the priorities as governed by available resources (e.g., available cores or processors, available memory, available bandwidth, available GPUs, available buffer space, urgency of sensor data, etc.). For example, in view that a live, real-time wireframe model has highest priority in the example, post processing instructions 212 would prioritize construction of observed wireframe models, possibly through 3D analysis via GPUs, of the musicians by compiling the wireframe models into streams (e.g., create motion capture frames or key frames, etc.). The wireframe streams might include animation sequences for each model. Further, each model could be compiled down into a single stream or each model could be part of an independent stream. With respect to streaming, the layers or renderable content could be encoded via one or more streaming protocols (e.g., MPEG-DASH, RTMP, RTSP, HDS, SRT, WebRTC, H.264, etc.).

Consider an example where the sensor data is compiled down into one or more point-clouds, say a point-cloud for a stage and one or more point-clouds for performers on the stage. Post-processing instructions 212 might be instructed to create two streams or renderable instructions for the point-clouds, one for the stage and one the performers. The performers' digital data stream would likely be a set of higher priority renderable content with point-clouds of the performers relative to the renderable content of the background stage. In either case, the point-clouds could include real-time updates delivered as part of the streams. One technique for managing point-clouds include those provided by one or more point-cloud packages (e.g., see URLs www.pointclouds.org, www.point.cloud, etc.).

Beyond use of point-clouds, performer wireframe models or poses can be created or tracked in real-time as the sensors capture sensor data of each performer. The resulting models can then be compiled into corresponding digital data streams, according to the prioritization policy, as individual layers of renderable content. Example techniques that can be leveraged to track poses, especially in a "marker-less" environment, include those provided by the open source project OpenPose (see URL github.com/CMU-Perceptual-Computing-Lab/openpose and as described in Cao et al., "OpenPose: Realtime Multi-Person 2D Pose Estimation using Part Affinity Fields", 2019 (v2), arxiv.org/abs/1812.08008, hereby incorporated by reference in its entirety).

While the above example is provided from the perspective of a live concert event, one should appreciate post processing 212 facilities can apply to other use cases as well. Example additional use cases can include in real life (IRL) streaming, gaming event, sport events, military training, physical therapy sessions, teaching, telemedicine, or other types of events. One particular area of interest includes movie production where sensor data includes observed data of a live movie set and possibly includes observed data from one or more virtual or rendered images on a large LED back drop wall. In some embodiments of movie production, the prioritization policy could include support for one or more feedback channels from endpoint devices or other sources to alter the environment, possibly by instructing a backdrop LED wall to change its rendering behavior of a scene (e.g., change perspective, change parallax, modify rendered objects, focus, blur, change rendered objects, change lighting, etc.).

The prioritization instructions 216, when executed by the processor 120, may enable the production center 112 to prioritize certain data streams according to the prioritization policy for transmission across the communication network 104. In some embodiments, prioritization policy can include specific instructions that dictate how prioritization instructions 216 execute. In some embodiments, the prioritization instructions 216 may be configured to determine a priority for different data streams and then cause each of the different data streams to be transmitted according to the determined priority.

The prioritization policy may dictate how streams are compiled or transmitted based on one or more factors. Example factors include one or more of the following: a time when one or more streams are transmitted, or amount of bandwidth (e.g., 1%, 10%, etc.) consumed by a stream, average data rate of a stream (e.g., 1 Mbps, 10 Mbps, 100 Mbps, 1 Gbps, etc.) or other factors. Further prioritization instructions 216 preferably embed rendering priorities into one or more of the digital data stream according to prioritization policy. Rendering priorities include instructions to endpoint devices that govern how or when each layer of the renderable content is rendered. For example, the rendering priorities could instruct the endpoint devices to create one or more queues where each queue represents a time slot. The layers of rendering content can then be placed in the queues in the order of their priority. When a queue's time slot is active, the endpoint device can then render the layers of renderable content in their prescribed order.

In some embodiments, different user devices 108 may subscribe to different types of data streams and each data stream may consume a different amount of network resources (e.g., bandwidth). The prioritization instructions 216 may be configured to determine an appropriate prioritization of different data streams to satisfy a particular objective function of the prioritization policy (e.g., minimize bandwidth utilization, minimize delay for high priority customers, minimize total transmission delay for all data streams, accommodate a particular Quality of Service (QoS) requirement, preferred routes, etc.). The prioritization instructions 216 may also be configured to determine a priority for sensor data to be used in generating a particular data stream (e.g., by determining which sensor data should be used to generate a composite image or update a composite image from one frame to the next, etc.). Certain types of sensor data may be considered a higher priority for use in updating the composite image as compared to other types of sensor data and the prioritization instructions 216 may be configured to ensure the higher priority types of sensor data are used to update the composite image more frequently than lower priority types of sensor data. For instance, the video data may be assigned a higher priority than accelerometer data, which means that each update to video data received as the sensor data processing instructions 208 may result in an update to an image broadcast across the communication network 104 whereas each update to accelerometer data may not always result in an update to the image broadcast across the communication network 104. Rather, the accelerometer data may be used only once every ten times the sensor data processing instructions 208 register a change in the accelerometer data. After the tenth registered change, then the post-processing instructions 212 may update the composite image based on the accelerometer data. In more specific but non-limiting examples, there may be uses cases that utilize different prioritizations of sensor data or parts of the sensor data to construct the streams. For example, a full bandwidth Internet connection (e.g., Twitch.TV, etc.) could leverage all sensor data. However, a gaming service (e.g., Goggle Stadia, Steam, etc.) would benefit from low latency, thereby requiring smaller packets. In the later scenario, audio data may be sacrificed (or assigned a lower priority than) in favor of video data or sensor data describing position information for the object. Prioritization instructions 216 could leverage, according to definitions within the prioritization policy, a matrix, look-up table, or other data structure to determine which features or streams should be prioritized relative to subscription levels or how content from each stream should be prioritized for rendering based on such subscription level. Each level or feature can be prioritized based on a fee structure (e.g., flat fee, bid, subscription costs, one-time charge, rent, lease, auctioned fees, etc.).

While a physical environment may have a multitude of sensors, the sensors might not be able to capture 100% of the environment. For example, an object in the environment might occlude other objects in the environment with respect to one or more sensor points of view thereby forming a blind spot or gap. Thus, when compiling digital data streams for remote rendering, gaps in the sensor coverage could be discovered, possibly based one or more PoVs. Such gaps might not be relevant if there are a set of allowable, pre-determined PoVs. However, in more dynamic embodiments allowing remote endpoint devices to select virtual PoVs, the gaps might be problematic. Differencing instructions 220 aid in dealing with gaps according to prioritization of gap management feature within the prioritization policy.

The differencing instructions 220, when executed by the processor 120, may enable the production center 112 to determine differences from one transmitted unit of content (e.g., an image, frame, audio segment, etc.) to a next unit of content (e.g., next image, next frame, next audio segment, etc.). Differences may include gaps in the sensor data such as gaps between units of transmitted renderable content (e.g., images, frames, videos, audio, wireframe model positions, etc.). In some embodiments, the differencing instructions 220 may be configured to determine a key frame and locations of objects 136 within the key frame that is transmitted across the communication network 104. The differencing instructions 220 may then determine when changes occur relative to the key frame (with respect to observed particular objects 136 via sensor data) and then generate composite images based on reference to the key frame and to the changes that have occurred relative to the key frame. Typically, such an approach would require a buffer and delayed processing before transmission. However, it is also possible a remote endpoint device can be instrumented with software to identify gaps and generate interpolated content to fill in the gaps. Utilization of the differencing instructions 220 may result in minimized bandwidth utilization since the data for generating an entire image does not necessarily have to be transmitted across the communication network 104 at every instance the scene 132 changes. Rather, other than key frames, the differencing instructions 220 can cause images to be produced on the user device 108 without transmitting all of the data used to generate frames relative to the key frame. Additional details regarding the use of key frames and differences are described in U.S. Patent Publication No. 2006/0136581, the entire contents of which are hereby incorporated herein by reference, and it should be appreciated that the differencing instructions 220 may be configured to operate in accordance with the methods described therein.

Additionally, the differencing instructions 220 may be configured to operate differently under different conditions, priorities defined in the prioritization policy, and/or for different use cases, even possibly according to subscription levels. For instance, the differencing instructions 220 may be programmed to minimize latency in certain use cases, which may cause the differencing instructions 220 to utilize a fewer number of key frames over a determined amount of time and to update the differences from the key frames at a relatively high rate (e.g., updates occurring every second or fraction of a second). In such a situation, buffering may not be utilized as heavily in favor of trying to convey the updated data to user devices 108 that receive the updates. Conversely, use cases that require data accuracy over latency may require the differencing instructions 220 to generate key frames more frequently (e.g., new key frames being generated every second or ten seconds) as compared to use cases where latency is being minimized. This is because the amount of data conveyed in a key frame is generally larger than the amount of data conveyed in a difference reported relative to the key frame; however, the key frame is considered more accurate than the differences, especially as a key frame becomes older.

Another aspect of sensor data gap management includes filling in gaps in renderable content that might occur due to gaps in the sensor data. The interpolation instructions 224, when executed by the processor 120, may enable the production center 112 to interpolate gaps between sensor data and fill such gaps with appropriate rendering content representing the results of the interpolation. For instance, the interpolation instructions 224 may be configured to determine that a first sensor 140 has detected a first surface of an object 136, possibly a captured texture, from a first angle and that second sensor 140 (which may be a different type of sensor as the first sensor 140 or the same type of sensor as the first sensor 140) has detected another surface of the object 136 that is different from the first surface. The interpolation instructions 224 may be configured to generate an interpolation of data between the first surface and the other surface detected by the second sensor 140 to more accurately represent or depict the object 136 when rendering the object 136 in a composite image using data from the first sensor and second sensor. For example, interpolation instructions 224 could generate a renderable texture in the gap where the renderable texture provides a color gradient or pattern match between the two (or more) observed surfaces while account for affine transformations. While depicted as instructions, it should also be appreciated that the interpolation instructions 224 may be provided as or use a neural network or the like to provide functionality as described in connection with the interpolation instructions 224. More specifically, the interpolation instructions 224 may be implemented in the form of a neural network having determined number of layers and nodes within each layer. In some embodiments, the neural network may be trained on interpolations examples for video, audio, etc. Once trained, the neural network may be used to fill gaps between sensor data. In some embodiments, the interpolation instructions 224 executed as a neural network may be configured to only rely on a previous frame rather than constructing new frames between a time T=0 frame and a time T=later frame. Such a neural network can be trained on captured sensor data lacking gaps by creating artificial gaps in the data sets. The "gappy" data and the removed sensor data become the training data set. One should also appreciate interpolation instructions 224 also operate according to the prioritization policy. For example, the prioritization policy can include provisions for which types of gaps should be interpolated or when interpolation should be done. Such provisions can be implemented as rules governed by operation attributes associated with production center 112 (e.g., available memory, available processing power, available bandwidth, number of endpoint subscribers, etc.). Still further, archived production sensor data from previous broadcast events can be used as training data for such AI techniques.

The privacy instructions 228, also operating in accordance with the prioritization policy, when executed by the processor 120, may enable the production center 112 to identify objects 136 or portions of the scene 132 that are subject to privacy controls, should be restricted from presentation in a composite image, should be obfuscated in the composite image, or should be obfuscated with presentation of a character/icon/emoticon/AR model/etc. instead of presenting the true image of the object 136 or portion of the scene 132 subject to privacy controls. For instance, the privacy instructions 228 may be configured to identify individuals whose identity should not be presented in the broadcast and, in response thereto, may instruct the post-processing instructions 212 to obfuscate or otherwise hide the individual(s), objects, symbols, or other entities using any type of obfuscation or blurring technique. Another example can include obscuring advertisements or brands that have not paid for placement within a compiled data stream. Various types of blurring techniques may be utilized, which may include, for example, Gaussian blurring, face detection and removal/replacing, etc. For example, foreground and background portions of an image may be identified and then particular portions of the background portions (e.g., audience, etc.) may be automatically blurred or obfuscated as described in U.S. Pat. No. 8,593,542 to Steinberg et al., the entire contents of which are hereby incorporated herein by reference. Image processing and computer vision infrastructure that can be leveraged to identify entities in image or video data modalities include OpenCV (see URL www.opencv.org). The prioritization policy can include specific instructions or directives on which privacy features to enable. Privacy features can be implemented using a privacy namespace or ontology describing available privacy features. For example, such a privacy data structure might include which sensed or observed people (e.g., performers, actors, etc.) can have their likeness incorporated into renderable content and which people should not (e.g., audience, staff, etc.). One possible path for implementation of a privacy namespace could include a hierarchical structure of the form where each element in the structure includes an indication if the element should be kept private. Such a structure for people could be similar to: <person>.<name>.<part>::<Private, Public>. For a specific performer, this might be encoded similar to the following: Musician.JimiHendirx.Face::Public. Thus, such structures can be implemented as attribute-value pairs where the attributes adhere to a hierarchical namespace. In some embodiments, the prioritization policy can enforce privacy concerns via privacy instructions based on copyright or trademark restrictions. Such restrictions can be encoded based on input from stakeholders or via a programmatic API (e.g., RESTful, etc.).

In a somewhat similar vein, gap management, the disclosed techniques include management of observed anomalies of objects with the scene. Anomaly management instructions 232, when executed by the processor 120, may enable the production center 112 to identify anomalies or unexpected differences between an actual representation of an object 136 and an expected representation of an object 136. For instance, if an object 136 corresponds to a person and the person's clothing has been torn, ripped, or otherwise moved from an expected location relative to the person, the anomaly management instructions 232 may be configured to determine (e.g., based on received sensor data, based on processed sensor data, based on a priori scanned objects or environments, etc.) that the clothing is not sitting on the person as expected. This particular functionality of anomaly detection may be tunable (e.g., capable of being turned on and off during the occurrence of an event, etc.) via directives in the prioritization policy. Moreover, the anomaly management instructions 232 may be configured to automatically turn on or off depending upon conditions in the compilations for the data stream. Specifically, the anomaly management instructions 232 may be configured to determine that a particular data stream is optimized to minimize latency based on the prioritization policy directives, in which case the anomaly management instructions 232 may automatically turn off so as to minimize real-time processing required before the data stream is transmitted. On the other hand, if data accuracy is desired (e.g., during a remote surgical procedure, high precision training, etc.), then the anomaly management instructions 232 may automatically (or in response to human input or API call) turn on and being automatically identifying anomalies in the data stream (e.g., any motion or object that is either unexpected or has moved in an unexpected manner, etc.). The anomaly management instructions 232 may further be configured to modify a presentation of the anomaly to more closely match the expected presentation of the clothing and/or the person wearing the clothing (e.g., in a concert use case where the presentation of a performer's clothing acceptable to present with virtualization as compared to a remote surgical use case where actual data should be presented at all times). As such, an AR representation of the person may be built using the sensor data and the AR representation may be transmitted within the data stream such that the user device 108 displays the expected presentation of the person and clothing as compared to the actual presentation of the person and clothing as detected by sensor data. As another example, consider a play or a dance having multiple performers. In such scenarios, each performer has an expected attributes: position, orientation, spoken words, etc. Thus, anomaly management instructions 232 can monitor these known attributes as a function of time. If there is a mismatch between expectation and observed attributes, the system can then prioritize transmission of data relating to the mismatch.

One should keep in mind the sensor data, in some embodiments, is collected with respect to real-world environment. Therefore, some embodiments include the ability to affect the environment to facilitate or otherwise alter how sensor data is captured subject to measures enforced via the prioritization policy. Such techniques are advantageous for stage productions or movie production. The environment management instructions 236, when executed by the processor 120, may enable the production center 112 to identify a source of light or multiple sources of light (or other environment altering devices) relative to the scene 132 and/or objects 136. The environment management instructions 236 may also be configured to detect a direction of light relative to objects 136 and determine expected position(s) of shadows, glares, reflections, etc. that could be presented as part of a composite image. Alternatively or additionally, the environment management instructions 236 may be configured to receive sensor data and determine position(s) of shadows, glares, reflections, etc. that should be presented for each object 136 in the scene 132. The environment management instructions 236 may then be configured to transmit shadow/glare/reflection data as part of the data stream across the communication network. The information provided to the environment management instructions 236 may enable the user device(s) 108 to generate shadows/glares/reflections when rendering an image based on data received from the production center 112. The shadows/glares/reflections may, however, correspond to artificially generated artifacts in the image rather than true images of shadows/glares/reflections. Example techniques for managing lighting conditions of rendered content that can be leveraged include those described in U.S. Pat. No. 10,192,365 to Siddiqui et al. titled "Augmented Reality Content Rendering via Albedo Models, Systems and Methods" filed Sep. 18, 2017. The artificially generated shadows/glares/reflections may be presented relative to an actual image of the object 136 and/or relative to a model of the object 136. While functionality of the environment management instructions 236 has been primarily described in connection with monitoring and responding to light conditions, it should be appreciated that the environment management instructions 236 may alternatively or additionally be configured to monitor and control other aspects of a scene (e.g., audio aspects, color illumination aspects, contrast/foreground vs. background illumination aspects, temperature aspects to impact IR imaging, etc.). Still further, environment management instructions 236 provide environmental information that can be used to render one or more digital models of the environment on a remote client device. In some embodiments, possibly in IRL live streaming scenarios, feedback signals received from endpoint devices can include requests, commands, or suggestion for altering the environment where such signals can be received via RESTful APIs (subject to proper authentication), SMS message, chat boxes in live stream channels, or other via message passing techniques.

Production center 112 has the responsibility for creating layers of renderable content and embedding the layers of renderable content into one or more digital data streams based on the priorities or directives in the prioritization policy. One aspect of creating layers of the renderable content, as alluded to previously, includes construction of 2D, 3D, or 4D+ models of objects in the environment. The object management instructions 240, when executed by the processor 120, may enable the production center 112 to generate models of objects 136 in the scene, generate instructions for displaying or rendering such models (where the instructions are executed by the user devices 108 when rendering the models), depict motions or actions of such models relative to other models or relative to actual images of objects 136 in the scene 132, and perform other actions relative to particular objects 136. For instance, the object management instructions 240 may be configured to assign particular persons or objects 136 to a virtual or model-based representation thereof (e.g., animated characters representing actual people, animated vehicles representing actual vehicles, animated animals representing actual animals, motion capture models, etc.). The object management instructions 240 may then cause the virtual or model-based representations of objects 136 to be presented in a composite image and/or to be broadcast to the user devices 108 across the communication network 108 as delivered by corresponding one or more digital data streams.

Once, or when desirable, the layers of renderable content are encoded within the digital data streams, the corresponding digital streams are broadcast to one or more of the endpoint devices. The broadcasting instructions 248, when executed by the processor 120, may enable the production center 112 to prepare one or more digital data streams for transmission or broadcast across the communication network 104. The broadcasting instructions 248 may be configured to encode the data streams according to a predefined transmission standard or protocol. In some scenarios, the digital data streams may be broadcast via UDP, or other connectionless protocols. Such an approach is considered advantageous in scenarios where objects rendered in a layer on an endpoint device does not change frequently or is considered of low priority as defined in the prioritization policy (e.g., for background objects, for objects that have easily predicated behaviors, etc.). However, in other scenarios TCP, or other connection oriented protocols, would be a better match; for audio data for example. Use of protocols can be defined in the prioritization policy along with desired low-level encoding (e.g., MPEG-DASH, H.264, etc.). The broadcasting instructions 248 may also be responsive to outputs of the prioritization instructions 216 and transmit various digital data streams according to a determined priority thereof based on the directives of the prioritization policy. It should be appreciated that the broadcasting instructions 248 may enable the transmission of multiple data streams to multiple different destinations (e.g., client devices, venues, games, etc.), where each data stream may represent a different presentation of the same scene 132 and objects 136. For instance, one data stream may correspond to a full real-life and real-time presentation of the scene 132 whereas another data stream may include one or more AR components that replace or overlay an object 136 in the scene 132. Thus, each data stream transmitted by the broadcasting instructions 248 may represent sensor data from the same scene 132, but does not necessarily need to include the same sensor data or cause the same image to be produced at the far end (e.g., at the different user devices 108 receiving different data streams). Data streams can be broadcast via one or more techniques. The digital data streams can be sent via broadcasts, multicast, unicast, or streaming techniques. Further broadcast instructions 248 could integrate with other streaming platforms (e.g., YouTube, Twitch.TV, Skype, Zoom, etc.) to distribute streamed content via one or more streaming channels.

In support of broadcasting digital data streams and according to priorities set in the prioritization policy, the stream management instructions 252, when executed by the processor 120, may enable the production center 112 to manage the transmission of the various data streams based on the constraints of the network interface(s) 116. For instance, the stream management instructions 252 may be configured to commit certain data streams to an instance of buffer 244 while other data streams representing the same scene 132 are transmitted across the communication network 104. Once a particular data stream is transmitted, the stream management instructions 252 may retrieve the next data stream or chunk of data from the buffer 244 for transmission across the communication network 104. In this way, the stream management instructions 252 may work in cooperation with the broadcasting instructions 248 to transmit different data streams (or different sensor data) across the communication network 104 in an organized fashion, possibly according to priorities determined by the prioritization instructions 216.

Digital data streams can take on many different forms depending on the desired use of data. Each digital data stream can be considered a manageable, in-memory data object, possibly instantiated based on one or more classes or associated methods. Thus, a digital data stream can be constructed, destructed, cloned, moved in memory, updated, labeled, archived, or otherwise manipulated by the production center. Further, the digital data streams can be characterized via one or more parameters that describe the nature of the stream. Example parameters that may be considered useful with respect to the inventive subject matter include: a start time when the stream should begin broadcasting; an end time when the stream should end broadcasting if an end time exists; preferred broadcast method (e.g., via a service, unicast, broadcast, multicast, subscription, TCP, UDP, HTTP, etc.); priorities on compiling the layers of renderable content with respect to time or other resources; priorities on how corresponding layers or renderable content should be rendered; relevant subscription levels or fees; modality of the stream's layers; or compatibilities between contained renderable content and endpoint device capabilities; just to name a few.

Figure 3:
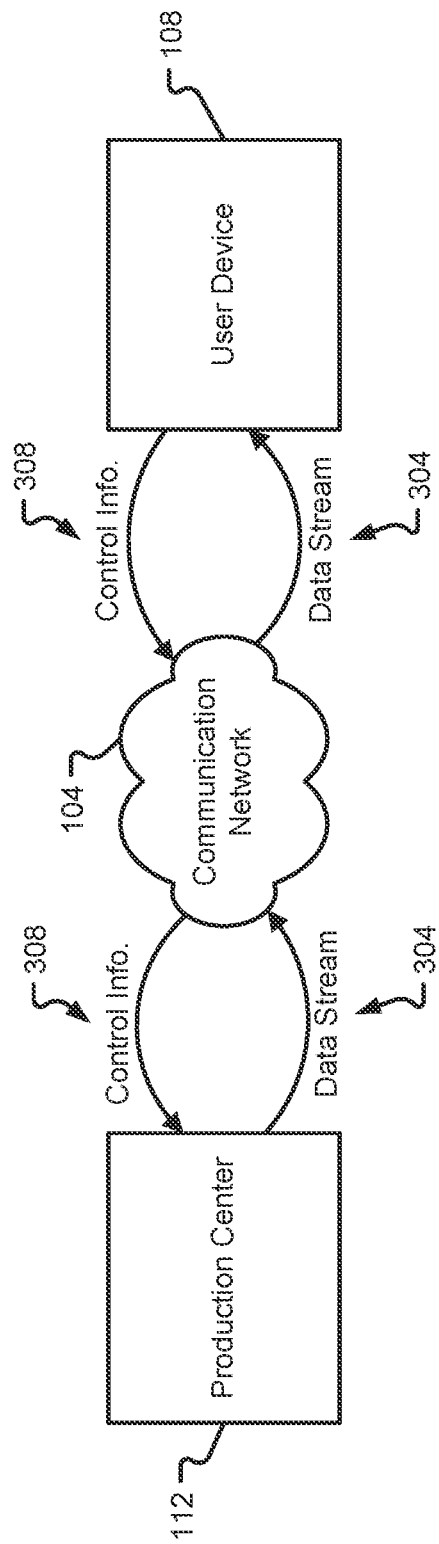
FIG. 3 illustrates data and control flows in accordance with at least some embodiments of the present disclosure.

As can be seen in FIG. 3, data streams 304 may be transmitted from the production center 112 (e.g., a studio, control booth, cloud-based streaming service, server farm, etc.) across the communication network 104 to one or more user devices 108. Non-limiting examples of a data stream 304 include unicast, multicast, broadcast, Twitch.TV, streaming services, YouTube (e.g., publishing platforms, etc.), etc. It should also be appreciated that control information 308 may be communicated back to the production center 112 from the user device(s) 108. For instance, control information 308 may describe the particular data stream 304 that a user device 108 desires to receive from the production center 112. Further control information 308 can include feedback signal from consumers of the broadcast back to production center 112 where production center 112 can modify its behavior based on the feedback signal. To the extent that the production center 112 may be configured to transmit different types of data streams, layers of renderable content, or different types of sensor data to user devices 108 (altering the presentation of the scene 132 based on the type of sensor data used within the data stream), the user devices 108 may be configured to communicate to the production center 112 that a particular data stream or type of sensor data is desired or not desired as part of the data stream 304. This enables users of the user devices 108 to customize their presentation of the scene 132 and objects 136 therein as compared to other users and user devices 108. This customized presentation of a common scene with different data streams and different sensor data effectively creates the opportunity to distribute multiple different versions of the same scene 132.

With reference now to FIGS. 4-9, various methods of operating the production center 112 and other components in the system 100 will be described in accordance with at least some embodiments of the present disclosure. The various methods described herein may be combined with other methods, may have various steps shared between methods, or may be performed as different methods without departing from the scope of the present disclosure. For instance, a particular method may include some steps depicted and described in conjunction with another method.

While certain embodiments will be described in connection with capturing and reproducing images or video of an event (e.g., live event, play, concert, show, sports match, movie shooting, IRL streaming, etc.), it should be appreciated that embodiments of the present disclosure are not so limited. Specifically, it should be appreciated that the system and methods disclosed herein are capable of building composite digital data streams of renderable layered content, which is stitched together from one or more data from different sensors (e.g., prioritized sensor data, sensor feeds, etc.). As a non-limiting example, a data stream may be treated as a digital data object in the computer science sense, which can have a temporal aspect or time series data (e.g., video, audio, etc.). The digital data stream may further include: attributes (e.g., start time, end time, content integration rules, content rendering instructions, prioritizations, etc.), multiple sensor data inputs, and inputs that are integrated according to the content integration rules. The data stream may be processed according to one or more rules to create "snap shots" in time (e.g., digital video frames, key frames, base-lines, etc.). The various snap shots, updates to snap shots, or changes to snap shots may be broadcast, unicast, multicast, etc. to one or a number of far end users according to rules and prioritizations as described in further detail below. The reproduction of the data stream may include image data, IR data, audio data, GPS data, Bluetooth data, metadata, and other data as described herein, thereby enabling the creation of a rich production of the data stream and the scene represented thereby.

Figure 4:
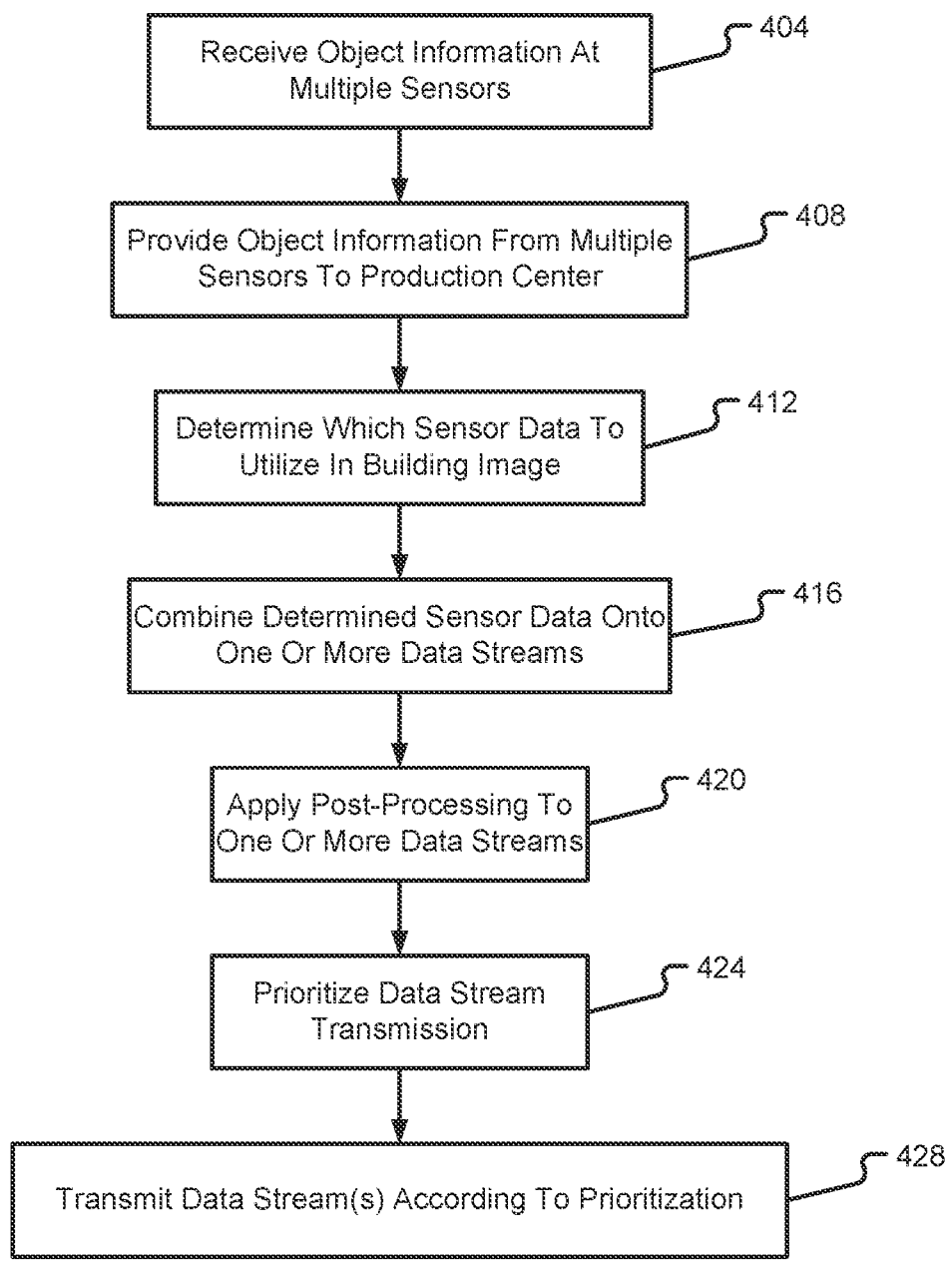
FIG. 4 is a flow chart depicting a method capturing and sharing sensor data across a communication network in accordance with at least some embodiments of the present disclosure.

Referring initially to FIG. 4, a first method will be described in accordance with at least some embodiments of the present disclosure. While the steps of the method are presented in a particular order, one should appreciate the step may operate in differing arrangements. The first method may correspond to a method for capturing and sharing sensor data across a communication network 104 in accordance with at least some embodiments of the present disclosure. The method begins when object information is received at multiple sensors 140 distributed around a scene 132 (step 404). The object information may correspond to information sensed by the sensors 140 that describe one or more objects 136 in the scene 132. For instance, object information may correspond to a visible image of an object 136, an IR image of an object 136, a UV image of an object 136, a LIDAR or depth image of an object 136, accelerometer data for an object 136, motion information for an object 136, or any other information describing an object that is capable of being sensed by one or more of a sensor 140.

The object information received at the various sensors 140 may be provided to the production center 112 as sensor data (step 408). The sensor data may be provided to the production center 112 either via a wired or wireless communication. The sensor data from the various sensors 140 may include a description of the object information (e.g., to the extent that the sensor data describes a characteristic of an object). The sensor data may reach the production center 112 via the sensor interface 128.

The method then continues with the sensor processing instructions 208 operating according to the prioritization policy in determining which sensor data should be used to build a composite image or model of the scene 132 and objects 136 included therein (step 412). This particular step may be performed entirely by the sensor data processing instructions 208 or may be performed with the assistance of other instructions stored in memory 124 (e.g., interpolation instructions 224, privacy instructions 228, anomaly management instructions 232, environment management instructions 236, object management instructions 240, combinations thereof, etc.). In some embodiments, determining which sensor data to utilize may include prioritizing some sensor data over other sensor data as directed by the prioritization policy. For instance, first sensor data may be prioritized over second sensor data such that the first sensor data is used to build an image of the scene 132 whereas second sensor data is not used to build the image of the scene 132. For example, sensor data related to a specific performer (e.g., lead actor, lead vocal, etc.) might be prioritized over a different performer (e.g., background vocal, minor actor, etc.). Alternatively or additionally, this particular step may include prioritizing first sensor data and second sensor data such that the first sensor data is primarily used to build the image of the scene 132 whereas the second sensor data is initially ignored for purposes of building the image of the scene 132, but the second sensor data is used to fill gaps or interpolate between gaps of the first sensor data. In this way, the second sensor data can help build a complete image of the scene 132. Accordingly, utilization of multi-sensor data can be used to build a composite image of a scene 132 for broadcasting to a plurality of endpoints (e.g., client devices, browsers, mobile phones, smart TVs, etc.). Prioritizing sensor data can be achieved through executing implementations of pattern recognition algorithms on the sensor data to determine if the sensor data is indeed capturing data about prioritized target objects. Example pattern recognition algorithms include natural language processing algorithm, image processing algorithms (see URL www.opencv.org, DETR, posenet, edge detection, etc.), symbol processing algorithms (e.g., OCR, bar code reader, QR code reader, etc.) or other types of algorithms. Such algorithm can be leveraged by generating digital signatures (e.g., descriptors, features, edges, etc.) from the sensor data. The digital signatures can then be used to look up object identifies (e.g., via nearest neighbor, via lookup tables, via databases, etc.). Further, the prioritization policy can include a list of objects to be prioritized or a set of corresponding desirable digital signatures. The objects can be included in the prioritization policy as objects, as object types, based on sensor data modalities, or according to other formats.

The method may then continue with the production center 112 keeping or using the sensor data identified in step 412 to build one or more digital data streams having layers of renderable content that can be used to render an image or representation of the scene 132 based on the sensor data contained therein (step 416). In some embodiments, the production center 112 may be configured to build or compile one or more different digital data streams, each of which may represent the same scene 132, but that include different layers of renderable content derived from sensor data for representing the scene 132. Thus, each digital data stream may result in a different rendering or presentation of the same scene 132, depending upon various factors such as the type of sensor data used for the particular data stream. Specifically, a data stream may be encoded with data from a number of different types of sensors. In this sense, the data stream may be encoded with image data from an RGB image sensor (e.g., MPEG, JPEG, VVC, H.263, H.265, H.266, etc.), image data from an IR sensor, LIDAR sensor data, Bluetooth data, GPS data, NFC/tag data (e.g., NDEF), audio data (e.g., MP2, MP3, SBC, G.711, G.722, G.726, G.728, G.729, etc.), and any other data format known or yet to be developed.

One should appreciate the sensor data can be encoded in a digital data stream in different ways. In some embodiments, the raw sensor data may be compiled into one or more digital data streams as renderable layers of content per directives from the prioritization policy. In such case, remote endpoint devices can be configured to render the layers of content through appropriate applications corresponding to the content encodings. However, additionally or alternatively, the raw sensor data can be processed to facilitate rendering of the corresponding renderable layers of content. For example, raw image or video data may be processed to create renderable 3D augmented reality models, were each model can encoded in and sent via separate digital data streams where each stream is prioritized. The remote endpoint devices can then superimpose the 3D augmented reality models on images of the real-world according to instructions in the prioritization policy (e.g., which model is rendered first, where models are to be placed, which models could be ignored based on resources or timing, etc.).

The production center 112 may then utilize the post-processing instructions 212 to prepare each of the one or more data streams for transmission, along with corresponding or embedded prioritizations, across the communication network 104 (step 420). This may be done in a number of different ways. For instance, many different types of data (e.g., data modalities, raw data, processed data, etc.) may be encapsulated together into a single packet and transmitted across the communication network 104 along with instructions for unencapsulating the packet and decoding each data type. One should note each data stream preferably corresponds to one or more prioritized layer of renderable content. Once decoded, the different types of data may be used to generate a reproduction or rendering of the scene 132 at the endpoint devices, where the endpoint devices render the corresponding renderable layer of content according to the priorities encoded in the digital data streams or provided by the prioritization policy. Alternatively, different types of data may be transmitted in different packets (e.g., in a multiplexing fashion, etc.) and may be tagged with a data type identifier. Each data type may be collected at the receiving side for a particular instance or period of time. After required data types have been collected, the receiving side endpoint device may generate or render a reproduction of the scene 132 based on the layers of renderable content in the digital data streams for the user on the user's device at the far end. In either situation, each of the data streams may then be prioritized by the prioritization instructions 216 (step 424) and transmitted across the communication network 104 according to the determined prioritization (step 428). It should be appreciated that lower priority data streams may be held in the buffer 244 until such time as the data streams are next in priority to transmit.

In some embodiments, prioritizations in the prioritization policy may be determined based on the relative importance of various factors. For example, latency might be of higher value or import as compared to data accuracy and some consumers may pay a premium to receive more bandwidth that is capable of minimizing latency while simultaneously maximizing data accuracy. For instance, a first subscribing consumer and second subscribing consumer may both receive data streams for the same live gaming event or concert. The first consumer may have paid a premium (e.g., higher subscription level, more money, more credits, larger one-time payment, etc.) relative to the second consumer.

Alternatively or additionally, the first consumer may have obtained a favored subscription level (e.g., gold level, platinum level, etc.) whereas the second consumer has not obtained the favored subscription level. In either scenario, the data stream delivered to the second consumer may have a first prioritization applied thereto whereas the data stream delivered to the second consumer may have a second prioritization applied thereto, which causes the second consumer to see the content of the data stream later than the first consumer or with less fidelity (or possibly see a less accurate version of the event as compared to the first consumer). The different prioritization applied to each consumer's data stream may also cause different data to be encoded on each data stream. Continuing the above example, the data stream delivered to the first consumer may include data from image sensors, LIDAR sensors, IR sensors, microphones, etc. whereas the data stream delivered to the second consumer may only include a subset of the data delivered to the first consumer (e.g., only data from image sensors and microphones). Alternatively, the exact same types of data may be delivered on data streams to both consumers, but the first consumer may receive the data stream sooner (e.g., without buffering) or may receive more accurate representations of the data (e.g., by use of more key frames). Still further, the first consumer might receive a digital data stream having high fidelity 3D real-time models, while the second consumer may receive low fidelity models.

Figure 5:
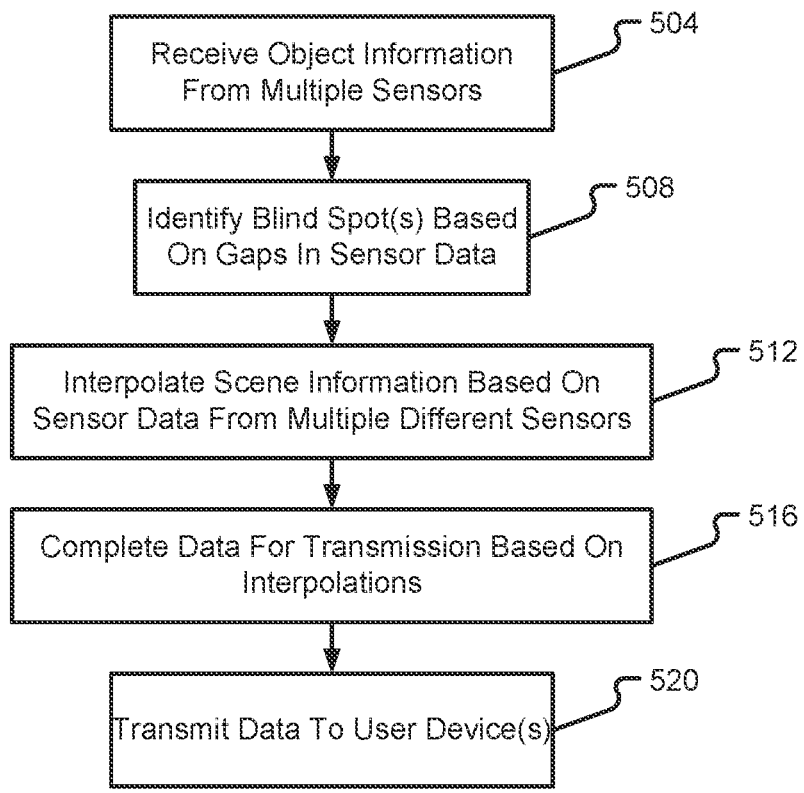
FIG. 5 is a flow chart depicting an interpolation method in accordance with at least some embodiments of the present disclosure.

Returning to data gap management, FIG. 5 details an interpolation method in accordance with at least some embodiments of the present disclosure. The method begins by receiving object information based on data directly from or derived from multiple sensors 140 distributed around a scene 132 (step 504). This step may be similar to steps 404.

The method continues with the interpolation instructions 224 identifying one or more sensor blind spots in the scene based on gaps in the sensor data received at the production center 112 (step 508). Gaps may be identified based on portions of the scene 132 that cannot or are not detectable by sensors of the same type or by sensors of different types. Said another way, a sensor blind spot may be detected based on a gap between two sensors of the same type (e.g., based on a gap between two cameras, etc.) or a blind spot may be detected based on a gap between two sensors of a different type (e.g., based on a gap between a camera and a LIDAR sensor, etc.). Embodiments of the present disclosure may also account for expected scene data versus observed scene data from different orientations and positions. The gathered data and expected data can be used to construct an image (e.g., a three-dimensional image, etc.) so to determine "gaps", the system could scan the sensor data from virtual camera positions and orientations to identify differences. This could be achieved by partitioning a 4 pi steradian sphere into a set number of possible camera positions or PoVs, and then determining if each position has sufficient data to render the image (e.g., check for gaps, etc.). The collection of gaps can then be used for interpolation. It should also be noted that the number of virtual camera positions could vary to permit faster processing, to increase fidelity, etc. Still further, in some embodiments, the scene can be a priori modeled (e.g., scan of a stage, modeled for movie production, models of performers or objects, etc.) in a manner where the production center has a complete expected environment, include an expectation of the environment's state as a function of time. Then, as the production center observes the environment via the sensor data, the production center can identify occluded areas or gaps by comparing the observed sensor data, in real-time, to expected models. Such an approach is considered advantageous in scenarios where blocking or choreography is knowns beforehand.

The method continues with the interpolation instructions 224 interpolating scene information based on the sensor data received from the various sensors 140 distributed around the scene 132 (step 512). The interpolation may be based on sensor data of the same type, sensor data of different types, or models of the environment. Still further the prioritization policy can provide insight in which types of gaps should be interpolated. For example, the production center may be instructed via the prioritization policy to fill in observed gaps related to a lead performer while gaps found relating to backup performers might not be interpolated. This approach is considered advantageous because it reduces computations of the production center necessary to complete compilations of digital data streams, reduces bandwidth on sending digital data streams, and reduces need to full rendering on the endpoint devices.

The interpolation instructions 224 may then complete compilation of the digital data streams for transmission based on the interpolations (step 516). In this step, certain portions of the scene 132 may be represented with actual sensor data whereas other portions (e.g., identified gaps or blind spots) may be represented with interpolations between sensor data. The method then continues with the production center 112 transmitting the data stream(s) to the various user devices 108 (step 520).

Figure 6:
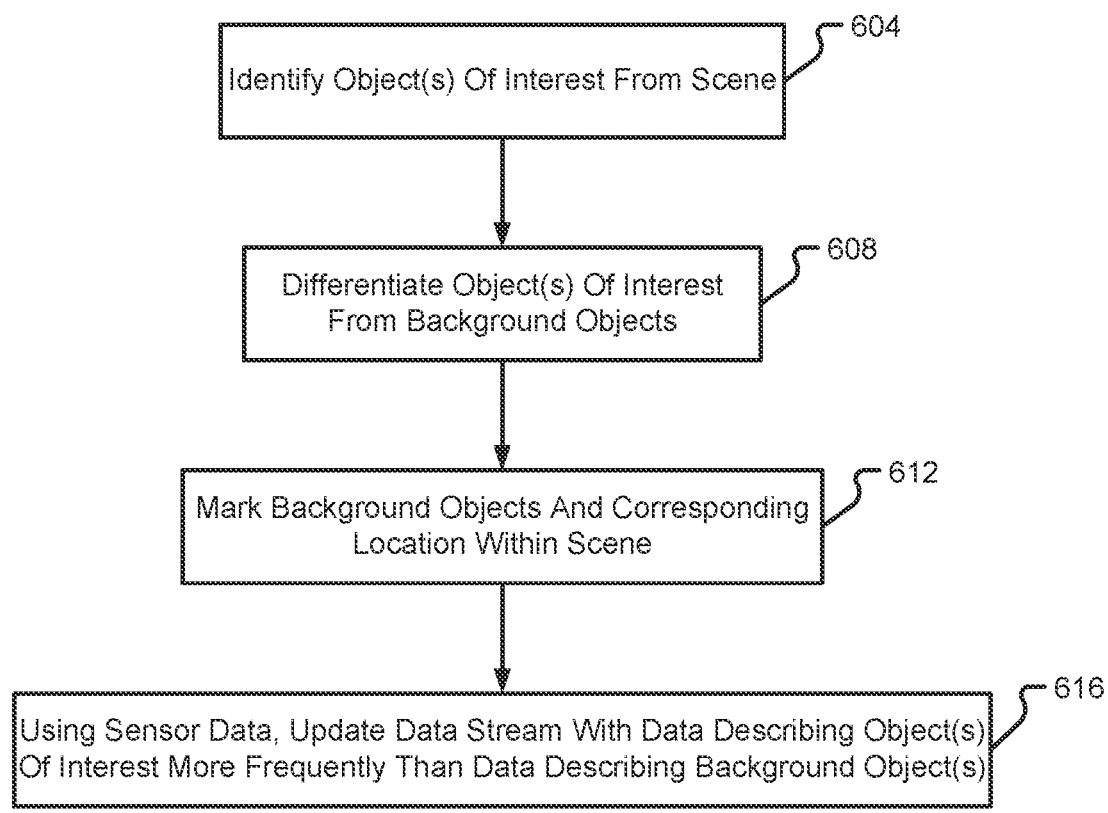
FIG. 6 is a flow chart depicting a prioritization method in accordance with at least some embodiments of the present disclosure.
Figure 7:
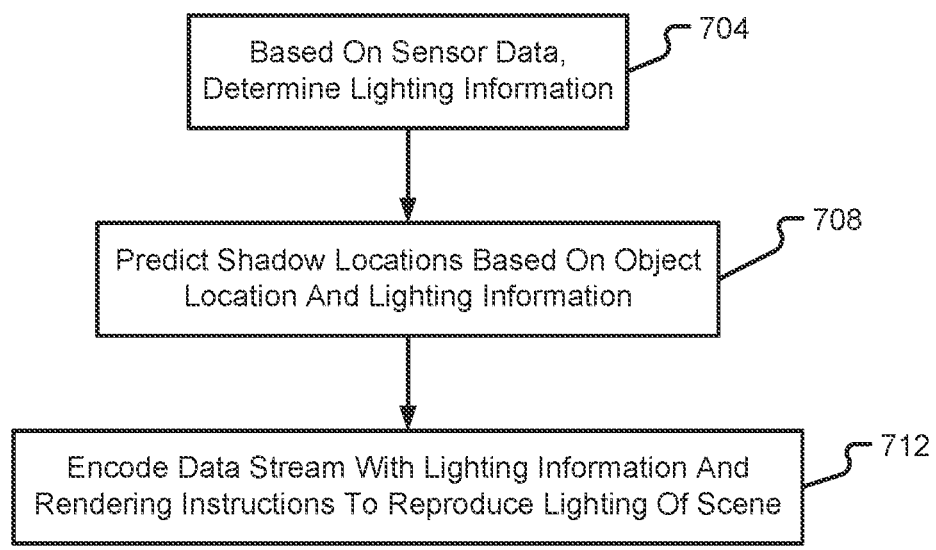
FIG. 7 is a flow chart depicting a lighting management method in accordance with at least some embodiments of the present disclosure.
Figure 8:
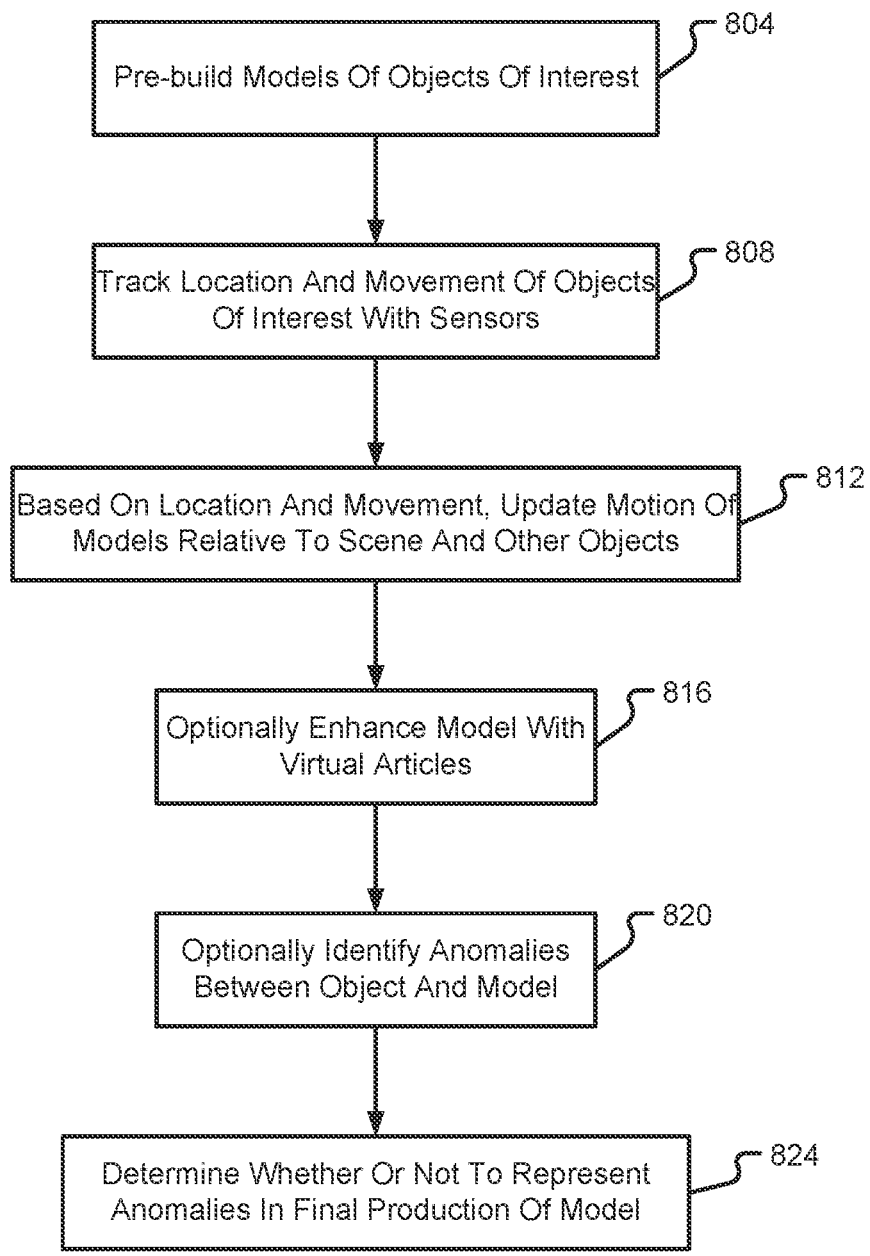
FIG. 8 is a flow chart depicting an object modeling method in accordance with at least some embodiments of the present disclosure.

The following discussion regarding FIGS. 6-8 relate to taken actions based on one or more prioritization policies; thus, it would be useful to describe possible embodiments of a prioritization policy to facilitate the discussion. The prioritization policy may be implemented in numerous ways including scripts, compiled code, markup language files (e.g., XML, JSON, YAML, etc.), or other forms of computer readable instructions. Further, a prioritization policy may be built for a specific purpose having well defined event scenarios, possibly to support movie production where a script and stage setting are very well known. In other embodiments, the prioritization policy may be more generic, possibly based on templates that can be adapted to a wide variety of situations. Each prioritization policy can have one or more sections, possibly arranged hierarchically, that define the priorities for generating digital data streams for layers of renderable content. A sensor section might include a list of which sensors should be observed along with their order of priorities. An additional section might include objects' priorities outlining which objects should be observed more closely and would be compiled into digital data streams. The policy can also include a matrix where each dimension represents an aspect of the workflow (e.g., a sensor dimension, a data stream compilation workflow dimension, a rendering dimensions, etc.). Each cell of the matrix can include one or more priorities associated with the corresponding values of the dimensions. Yet another section might include rules or directive that map the sensor data, object data, or other information into layers of renderable content. For example, rules or directives can include executable instructions that map observed textures and performs into a wireframe 3D models.

On should appreciate more than one prioritization policy can co-exist at the same time for a broadcast event based on various factors. One factor that may give rise to multiple prioritization polices includes subscription levels. In such embodiments, each subscription level could have a corresponding prioritization policy based on a for-fee basis or schedule. A high subscription level might correspond to a prioritization policy that generates high fidelity, real-time 3D models of the environment. A low subscription level might have a prioritization policy that merely prioritizes a wireframe with minor texture support. Another factor that could yield multiple prioritization policies includes pre-defined PoVs, to which endpoint devices can subscribe. Such an approach reduces the overall computational resources and decreases the need for bandwidth in transmitting corresponding digital data streams. Still further, endpoint devices could coordinate with the production center to define endpoint-specific prioritization policies, which may yield multiple prioritization polices.

With reference now to FIG. 6, details of a prioritization method will be described in accordance with at least some embodiments of the present disclosure. The method begins with the object management instructions 240 identifying particular object(s) 136 of interest within the scene 132 (step 604), preferably based on directives from the prioritization policy. An object of interest may correspond to any object 136 that is desirable to present within the scene 132 (e.g., a player, an actor, a scene prop, a product, a virtual object displayed on a large LED wall, etc.) and which is desired to present in a highlighted fashion. An object of interest may differ from a background object in that an object of interest is desirable to present as often as possible and is of particular interest to the user of the user device 108. Thus, the object management instructions 240 may be configured to differentiate object(s) of interest from background objects or other objects that do not necessarily correlate to a focus of the scene 132 (step 608). A background object may correspond to a spectator or fan of an event, an audience member, a prop, or the like, whereas an object of interest may correspond to a player, an actor, or a performer that is the subject of the event being broadcast. In some embodiments, the background objects may be determined by performing a pre-scan of a set/stage/environment prior to an event, thereby enabling an identification of objects that exist in the set/stage/environment prior to additional objects entering the set/stage/environment, which may more likely correspond to foreground objects or objects of interest. As previously mentioned, objects can be identified or recognized using implementations of object recognition or image processing algorithms; for example, those offered by the open source package OpenCV.

The object management instructions 240 may then be configured to mark objects and their corresponding location(s) within the scene 132 (step 612). It may also be possible to associate each location with a tag indicating whether the object at the location corresponds to an object of interest or a background object. This way the sensor data processing instructions 208 can be configured to update portions of the data streams with data describing the object(s) of interest more frequently as compared to the frequency with which data describing the background object(s) is updated (step 616). In some embodiments, the object management instructions 240 may be configured to ensure that objects of interest have their position and other sensor data updated as quickly as possible whereas some sensor data describing background objects is discarded or ignored when updating a data stream describing the scene 132. For example, objects can be tagged with markers (e.g., QR codes, RFID tags, symbols, textures, images, etc.) that can be identified readily from the sensor data. Tags can be used to identify objects as static while other tags might mark objects as dynamic, which can move about the environment for example. Static tags could be as simple as a priori analyzed features of the static objects (i.e., what the object looks like). Dynamic tags preferably are non-intrusive in the sense they do not distract the consumers. For example, a dynamic tag might be a bit of reflective clothing or a button worn by a performer that can be observed via one or more sensor. However, the production center software can easily track the feature of such tags. One aspect of the inventive subject matter is considered to include creating such tags (e.g., buttons, clothing patterns, symbols, etc.) that are easily tracked. The techniques described in U.S. Pat. No. 10,540,772 to Wnuk, titled "Feature Trackability Ranking, Systems and Methods", filed Feb. 25, 2019, can be adapted for creating tags that have high tractability features. The '772 patent is hereby incorporated by reference in its entirety. For example, a tag can be created and iteratively run through the techniques of the '772 patent to identify or enhance trackable features. Such features can be altered to make them more trackable with every iteration. One possible method for generating more trackable features can be achieved via executing an implementation of genetic algorithm that alters the tag's features with every iteration while only keeping the most trackable features for use with a future generation of features.

With reference now to FIG. 7, details of an environmental (e.g., lighting, special effects, props, displayed content on background monitors or LED walls, etc.) management method will be described in accordance with at least some embodiments of the present disclosure. The method begins with the environment management instructions 236 determining lighting information (or other environmental information) based on the sensor data received from the various sensors 140 (step 704). The information determined in step 704 may correspond to positions of light sources, relative positions of light sources and the scene 132, relative positions of light sources and object(s) 136, relative positions of light sources and sensors 140, position of audio sources, position of color sources, position of temperature sources, relative temperatures of object(s) 136, etc.

The environment management instructions 236 may be configured to determine shadow locations based on object 136 locations and the environment information (step 708). The environment management instructions 236 may also be configured to determine glare locations, reflection locations, echo locations, heightened temperature locations, and the like based on the object 136 locations and the environment information, possibly as sensed by the sensors.

The environment management instructions 236 may then encode the data stream with environment information that enables a receiving user device 108 to render the composite image based on the environment information (step 712). In particular, the data stream may be encoded with lighting information and rendering instructions that enable the user device 108 to reproduce the lighting of the scene. It should be appreciated that the environment of the scene may be reproduced with sensor data other than image-based sensor data. For instance, IR sensors, UV sensors, LIDARs, radars, depth sensors, microphones, biometric sensors, etc. can provide sensor data that is used to determine environment information and that is used to reproduce the environment of a scene 132 in a virtual manner rather than relying on actual images of shadows, glare, and reflections.

While FIG. 7 is presented within the context of lighting conditions, one should appreciate the method illustrated in FIG. 7 also applies to altering other conditions of the environments. Manipulation of the real-world environment can also include movement of objects (e.g., props, people, vehicles, cameras, robots, etc.), control over audio, behavior of automated equipment, providing direction to performers, or other types of real-world manipulation at the location of the event. Still further, virtual conditions within the environment could be altered. For example, in use cases where environment comprises a movie studio stage with a large video display (e.g., LED wall, TVs, monitors, etc.) used to display background images or content for the scene, the content presented on the display (i.e., virtually rendered content) can be altered, perhaps changing placement of virtual objects, moving virtual characters, etc.

With reference now to FIG. 8, details of an object modeling method will be described in accordance with at least some embodiments of the present disclosure. The method begins with the object management instructions 240 pre-building models of one or more objects of interest (step 804). Such models may correspond to animations, avatars, virtual representations, or other computer-generated representations of an object 136.

The object management instructions 240 may then track the location and movement of the object(s) having models associated therewith (step 808). The location and movement of the object(s) 136 may be tracked based on sensor data received from one or more sensors 140.

The object management instructions 240 then updates motion of the models relative to the scene 132 and other objects (step 812). In some embodiments, the object management instructions 240 may be configured to update the motion of the models based on the location and movement of the objects as determined based on the sensor data.

The models may then be optionally enhanced with one or more virtual articles (step 816). Non-limiting examples of virtual articles that can be used to enhance a model include virtual clothing, virtual accessories, virtual devices, etc. The anomaly management instructions 232 may also be configured to optionally identify anomalies between the object and the model representing the object (step 820). The anomaly management instructions 232 may then cooperate with the object management instructions 240 to determine whether or not to represent any identified anomalies in the final production of the model (step 824). In some embodiments, one data stream may be encoded to represent anomalies whereas other data streams may not be encoded to represent anomalies. For instance, a data stream that is more representative of the true images captured of the scene 132 (e.g., a real-time video presentation) may present the anomalies whereas an AR/VR/mixed reality representation of the scene 132 may not represent the anomalies in the final production of the model.

Object models, for example those referenced with FIG. 8, can be created using many different techniques. For example, observed sensor data can be compiled into one or more point-clouds as reference earlier, possibly leveraging use of the open source Point-cloud Library (see URL www.pointclouds.org). Additionally, objects can be modeled or created digitally through game engine tools, possibly including the Unity® game engine or the Unreal® engine. Still other tools that can be leveraged to create models based on captured sensor data include Blender (see URL www.blender.org), Maya® offered by Autodesk®, or similar tools. These tools, and others, enable creating layers of renderable content from the sensor data. The prioritization policy can include directives or instructions on which portions of the observed objects (or virtual objects not physically in the scene) should be modeled or rendered. Thus, observed or identified objects, possibly identified via an ID (e.g., UUID, GUID, hash, distributed ledger or blockchain address, etc.), map to priorities on how or when to integrate rendered objects (i.e., real or virtual) into the digital data streams.

Figure 9:
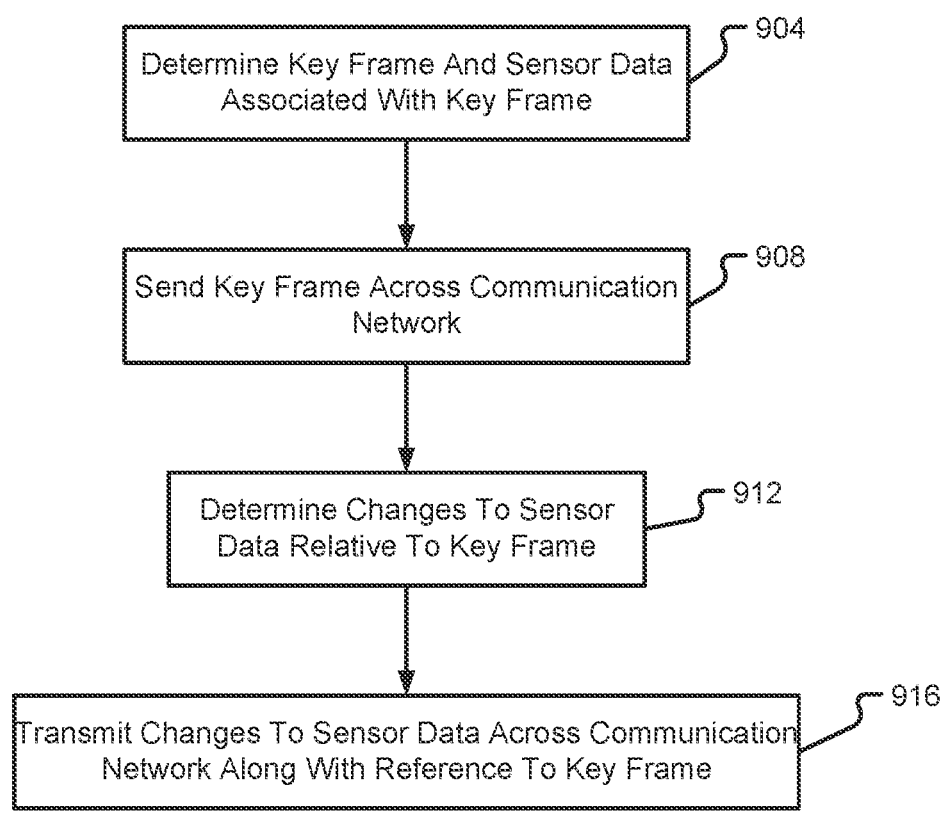
FIG. 9 is a flow chart depicting a method of transmitting sensor data in accordance with at least some embodiments of the present disclosure.

With reference now to FIG. 9, details of a method for transmitting sensor data will be described in accordance with at least some embodiments of the present disclosure. Based on the priorities encoded within the prioritization policy, the method begins with the differencing instructions 220 determining a key frame and the sensor data associated with the key frame (step 904). The sensor data may include any sensor data describing objects 136 within the scene 132 during a particular time in which the scene 132 is presented.

The differencing instructions 220 may then cause the key frame (or information describing the key frame) to be transmitted across the communication network 104 as part of a data steam (step 908). The key frame or information describing the key frame may be transmitted via execution of the broadcasting instructions 248 and/or stream management instructions 252. Transmission can leverage existing transport protocols, possibly including encryption (e.g., TCP, UDP, IP, HTTP, SSL, HTTPS, AES, TLS, etc.).

The differencing instructions 220 may then determine or observe changes to sensor data relative to the key frame as time elapses (step 912). In some embodiments, the differencing instructions 220 may track changes relative to particular sensor data and each change in sensor data may be communicated across the communication network 104 with reference to sensor data information contained within the key frame (step 916). Additionally, the prioritization policy can include prioritized directives which cause the production center to integrate observed changes into the layers of renderable content in the corresponding digital data streams. Alternatively or additionally, the differencing instructions 220 may wait until a predetermined number of changes have occurred or wait until the changes that have occurred meet a particular change threshold or satisfy change criteria in the prioritization policy (e.g., an object 136 has moved more than a predetermined distance, etc.) before transmitting changes or delta information across the communication network 104. As a more specific example, change criteria may be defined on an object-by-object basis. A first object may have a first change criteria defined in connection therewith (e.g., position, orientation, proximity to camera, etc.). If the first object is detected as moving or having updated object attributes that satisfy the change criteria, then changes or delta information for the first object may be determined and reported for integration into the relevant digital data stream. Continuing the above example, a second object may have a second change criteria defined in connection therewith and if the second object is not intended or anticipated to travel or change as much as the first object, then the second change criteria may be different (e.g., greater than or less than) than first change criteria and subject to a different priority with respect to update as defined the prioritization policy. If the second object is detected as moving more than expected per the second change criteria, then changes or delta information for the second object may be determined and reported as part of its relevant data digital stream or streams. In this way, change or delta information for one object (e.g., the first object, etc.) may be reported independently of change or delta information for another object (e.g., the second object, etc.) within the same data stream.

It should be appreciated that any combination of authentication processes depicted and described herein can be performed without departing from the scope of the present disclosure. Alternatively or additionally, any number of other authentication processes can be developed by combining various portions or sub-steps of the described authentication processes without departing from the scope of the present disclosure.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

The above discussion presents the inventive subject matter from a technical perspective. Still, there are a number of possible use cases or variations of the technology that are worth presenting of additional clarity. The following discussion provides additional color to the inventive subject matter.

It should be appreciated digital data streams can be managed (e.g., created, destroyed, monitored, inventoried, recovered, secured, etc.) as individual manageable objects. Stream objects can be instantiated, in the computer science sense, in one or more computer readable memories as data structures. For example, digital data streams can be instantiated from one or more classes, where an instantiated digital data stream has class members or parameters defining the specific class instance. Of particular interest, an instantiated digital data stream can include or inherit prioritization parameters from the prioritization policy (e.g., when instantiated, after instantiation via method calls, etc.). More specifically, the digital data stream's lifetime management priorities (e.g., when the stream should start sending data, when the stream should stop sending data, when the stream should be deconstructed, etc.) can be defined during construction or post instantiation. Further each stream can be assigned priorities including when the stream should be compiled relative to other streams, priorities on when streams should be transmitted relative to other streams, embedded rendering priorities for the corresponding layers of renderable content, or other priorities. Yet further, each digital data stream can include one or more network parameters outlining desired or required networking support features (e.g., latency, bandwidth, number of hops to endpoint devices, class of service, require transport protocols, etc.). These, and other possible parameters, may be used to provision network resources to support transmitting the digital data streams to endpoint devices. Example techniques that can adapted for use in provisioning networking resources (e.g., channels, fibers, latency, etc.) are described in U.S. Pat. No. 10,419,284 to Wittenschlaeger, titled "Software-Based Fabric Enablement", filed Nov. 28, 2017; and U.S. Pat. No. 10,826,796 to Charnock et al. titled "Virtual Circuits in Cloud Networks", filed Sep. 26, 2017. Thus, one aspect of the inventive subject matter is considered to include leveraging the prioritization policy directives to provision the network to support compiled digital data streams having prioritized layers of renderable content.

Streams can be managed according to their priorities in multiple ways. In some embodiments, the production center can use one or more queue systems. A queue can be assigned to each portion or stage of the workflow (e.g., capturing sensor data, recognizing or identifying scene objects, construction layers of renderable content, compiling digital data streams, transmitting the digital data streams, receiving feedback signals, etc.). Stream management tasks, or other tasks, can be placed in the queues according to their priorities to ensure that priorities are enforced relative to each other for each queue or among all queues. In addition to, or alternatively, the production center can manage tasks based on one or more time slices or time slots where high priority tasks (e.g., stream management tasks, etc.) can be assigned a larger number of time slices, while lower priority tasks have a smaller number of time slices.

In some embodiments, based one on the instructions encoded within the prioritization policy, the production center can compile or otherwise manage many different types of digital data streams. Example types of data streams can include content streams that include encodings of layers of digital content that are to be rendered on an endpoint device, management streams that parallel content streams and provide management instructions to and from endpoint devices where the management instructions control how the content or streams are manipulated (e.g., rate of playback, time shifting, buffering, etc.), feedback streams that provide data (e.g., feedback signals, requests, subscriptions, etc.) from endpoint devices back to the production center and that could control elements of the real-world environment being streamed, or other types of streams.

Returning the concept of using point-clouds, one should appreciate point-cloud management provides numerous technical advantages. In somewhat of a similar vein as streams, point-clouds can also be managed as objects that can be instantiated, deconstructed, moved, copied, or otherwise manipulated in memory of the production center or other computer system (e.g., endpoint devices, etc.). Point-clouds can be constructed, based on the rules or instructions provided in the prioritization policy, to serve in support of compiling the digital data streams or in support of forming layers of renderable content. Each renderable layer can be comprise of its own point-cloud, for example.

From the perspective of mixed reality (MR) environments, point-clouds can serve as the foundation for identifying anchor points within the real-world scene. As digital images of the scene are analyzed to find anchor points in the point-cloud, the production center can insert or superimpose AR/VR/MR content on the real-world at the corresponding anchor points. While the real-world scene would lack the AR content, the production center can compile the AR content or other virtual constructs into the layers of renderable content within one or more digital data streams as if the virtual constructs originated in the real-world environment. In some embodiments, the AR content could be embedded within a stream having layers of renderable content from the real-world. In other embodiments, the AR content can have its own dedicated stream where the endpoint devices render the AR content at the anchor point according to the corresponding directives of the prioritization policy. Example techniques that can be adapted for anchoring AR content with point-clouds are describes in U.S. Pat. No. 10,255,730 to Dzhurinskiy et al. titled "Chroma-Key Content Management Systems and Methods", filed Jun. 6, 2018. For example, a single point in a point-cloud can be an anchor, or a position interpolated among two or more points could become the anchor point.

While typical point-clouds in an image-based environment might include points that are human observable, it should be appreciated that the points could also include points discovered or otherwise observed outside the human senses. More specifically, an a priori known infrared point-cloud could be projected on the environment where an infrared sensor (e.g., a CCD array lacking an IR filter, CMOS, etc.) could then observe the points. The advantage of such an approach is the a priori known set of points allow for determining depth of field, positions of objects, orientations of objects, or other aspects of the real-world environment. Thus, the point-cloud could be determined based on the known IR (or other non-visible light) projected points, objects as certain distances, or other parameters. Still further, multiple sensor data modalities can be used to establish point-clouds or anchor points. U.S. patent application publication 2019/0294918 to Witchey et al. titled "Volumetric Descriptors" filed Mar. 20, 2019, discloses techniques that leverage multiple sensor data modalities, which could be used to identify points in a point-cloud having more than one sensed feature.

In view that a 3D broadcast event could have multiple, distinct streams broadcast to many endpoint devices, it is possible each stream could have a different latency. For example, when the prioritization policy enforces latency requirements on the different streams having layers of renderable content, the content in the streams could arrive out of synchronization with each other. Under such conditions, end users might experience undesirable rendering behavior. Thus, in some embodiments, especially in distributed environments where portions of digital data streams might have different origins (i.e., different real-world locations) or where endpoint devices are distributed over large distances, the prioritization policy can include rules for sets of streams arriving at a single endpoint device to have synchronized activation times. Techniques for managing rectification of latency includes those described in U.S. patent application publication 2021/0016168 to Soon-Shiong et al. titled "Latency Management in an Event Driven Network", filed Jul. 17, 2020.

Latency issues in a distributed environment can also be managed through other techniques. Consider an environment, or multiple environments, where the event is scripted (e.g., a play, a movie, a dance production, etc.) and produced in different physical locations (e.g., different stages, different studios, etc.). The prioritization policy can be instrumented or provisioned with the scripted information outlining what features or actions are expected at specified times, at least to within acceptable windows of time. As each environment collects or captures its individual data, the production center or production centers can compile the individual digital data streams with the layers of renderable content. Then, the production centers can transmit their individual digital data streams taking into account differences in expected latency of delivery at an endpoint device. For example, if two stages are separated by geographic distances (e.g., Los Angeles and London, etc.) and produce two layers of content as part of a single broadcast event, the production centers at each location can coordinate in order to send their streams accounting for differences in latency. The latencies can be measured beforehand through ICMP message (e.g., pings, etc.) relative to endpoint devices. The production centers can synchronize on a common time based on NTP, or GPS signals, which allow the production centers to ensure they are taking synchronized actions with respect to each other.

With respect to a particular interesting use-case, consider the use-case of the inventive subject matter with respect to movie production. The production of a scene can include defining one or more prioritizations policy, possibly associated with various stakeholders (e.g., director, producer, financier, special effects coordinator, performers, remote viewers, etc.). The prioritization policies, as discussed previously, govern how a movie scene's content can be compiled into layers of renderable content and transmitted to the stakeholders via digital data streams. For example, a director might require a complete rendering stream (e.g., real-world performers, CGI effects, background visual effects, etc.) that can be viewed in real-time (i.e., with minimized latency) so that they may be able to make real-time adjustments. Further, streams associated with other stakeholders (e.g., producers, etc.) might have lower priority, lower resolution, or might only receive streams at a later time (e.g., near real-time, later broadcast, etc.).

Some movie studios, as alluded to previously, leverage large, high resolution LED walls within a filming volume where the LED walls can render background images during filming a scene. In such embodiments, cameras, microphones, or other sensors are able to capture live, real-world elements of the scene (e.g., props, actors, etc.) as well as virtual objects rendered on the background LED walls. Thus, movie production embodiments can include capturing real-world and virtual objects at the same time from the observed scene. Further, in some embodiments, movie production systems can also insert virtual elements (e.g., augmented reality elements, mixed reality elements, CGI characters, etc.) into a captured scene and that are capable of interacting with the real-world elements or virtual objects presented on the LED walls. Thus, it should be appreciated, that a movie production embodiment would likely have features or stakeholders that would not necessarily be germane to in a live event broadcasts, say a concert. However, the fundamentals between the embodiments would remain consistent.

One major difference between a movie production system and other embodiments is the movie production system can use scripts, time stamps, choreography, dialog, blocking, pre-visualization elements (previs), or other planning features to aid in compiling layers of renderable content. For example, when compiling the digital data streams, the production center can observe known objects (e.g., real-world elements, virtual objects, injected CGI objects, etc.) relative to each other. When a conflict is observed among objects or with expected progress of a scene, the production center can consult with the prioritization policy to determine how to resolve the conflicts; a CGI character might be clipped relative to a real-world actor, background elements in rendered on the LED wall might be moved, etc. In more specific embodiments, planning features such as scripts, previs, and so on, can be used to populate the prioritization policy with expected object behaviors (e.g., positions, orientations, movements, actions, choreography, etc.), especially with respect to time. Such an approach is advantageous because it permits the production center to correct observed, conflicting issues when compiling the layers of renderable content by prioritizing which layers (e.g., scene, background LED wall, objects, CGI effects, etc.) should be rendered on the endpoint devices relative to each other. The prioritization policy can include object-specific or conflict-specific rules by which the production center can take action; the rules can indicate which individual objects or which actions should take priority over others, for example.

Interestingly, to continue building on conflict resolution issue, the prioritization policy's conflict resolution rules can also be used to manage undesirable objects as well as expected scene objects. Consider a scenario where a scene is being filmed on a stage and the scene requires physical filming infrastructure to support filming (e.g., scaffolds, cranes, cables, harnesses, etc.). Ordinarily such objects are removed in post-production or are removed using green screen effects. However, such approaches are cumbersome because the stakeholders cannot see what the final should look like in real-time and because post-production could uncover issues that require a reshoot. Using the disclosed approach, undesirable objects can be identified or recognized in real-time as conflicting objects based on the rules within the prioritization policy. The undesirable, conflicting objects can be digital removed because they have known shapes or structures and because the camera position and orientation can also be well defined with high precision. Still further, desirable objects (e.g., performers, props, etc.) are also known. Thus, the production center can interpolate what should be presented as part of the desirable objects once the occlusion has been removed. Example technologies capable of providing support for recognizing objects include those provided by OpenCV. Objects can be tracked through various techniques including simultaneous localization and mapping (SLAM), visual SLAM (vSLAM), just to name a few.

One should appreciate the disclosed inventive subject provides support for creating additional redundancy beyond traditional tracking technologies. Many movie sets leverage motion capture devices (e.g., OptiTrack® cameras, etc.) that track markers placed on performers. However, while useful when using post-production rendering for CGI effects, such techniques are less practical for real-time compilation of layers of renderable content. Through use of a prioritization policy identifying and tracking specific objects, the production center can augment tracking motion capture devices when occlusions can occur, or can, in some cases, obviate the need for motion capture devices. For example, the intrinsic features of an object can become the tracking features (i.e., rather than motion capture markers) leveraged by the production center as discussed previously.

One should appreciate movie production does not always occur within a well-defined physical setting. The physical environment in which movie scenes are film might include a filming volume of space that is well-define, but also extend outside the proper filming volume. Thus, on aspect of the inventive subject matter is considered to include managing objects beyond or outside a filming volume (e.g., cameras, lights, props, support staff, etc.). In such scenarios, the prioritization policy can include one or more instructions or rules governing the behavior of such object that might be outside the scope viewable by the stakeholders, but could indirectly impact the filming event. For example, as cameras (e.g., sensors, etc.) capture various points of a view, the prioritization policy can dictate which objects should take priority with respect to lighting. The lighting rules within the prioritization policy can then be used to govern how automated lighting device should move (e.g., move into the volume, move out of the volume, move relative to the volume, etc.). In such a use case, the production center can compile the images into layers of renderable for the various stakeholder such that they observe the filmed objects with the proper lighting.

While it is contemplated that most endpoint devices will leverage general purpose devices such as cell phones or personal computers, a movie production system might use devices that are purpose-built (e.g., cameras, camera-monitor system, editors, game engines, etc.). Thus, the production center can broadcast the compiled digital data streams to each stakeholder's desired device based on the dictates of the prioritization policy. For example, a director may elect to receive a digital data stream via a computer instrumented with studio production software (e.g., Open Broadcaster Software, etc.), which renders a scene according to the prioritization policy.

Shifting focus from the production environment to the endpoint devices, one should appreciate the disclosed technologies gives rise a complex and rich experience to an end user while also respecting the limitations of the user's endpoint device. The end user's endpoint device (e.g., cell phone, computer, VR headset, AR display, game console, etc.) receives the digital data streams encoding a corresponding layer (or layers) of renderable content. Each layer, as discussed previously, includes one or more priorities from the prioritization policy dictating how and/or when the layer should be rendered relative to other layers, or based on other criteria. This approach ensures the end user can experience the renderable content in a manner most efficient for the endpoint device or in a manner considered acceptable by the end user. For example, the prioritization policy might require all layers be rendered in a synchronized fashion so the user can enjoy a seamless experience. As the content in the streams arrive, the endpoint device can buffer the various streams in preparation for rendering. When sufficient content is available from the streams, the rendering of the layers can begin in a synchronous fashion. Such an approach might incur latency relative to when the content was broadcast, but the rendering, while delayed, would appear more natural to the end user and thereby enable the end user to feel like they are more part of the event.

Further to the point of enriching the user's experience, in some embodiments the user can participate as a virtual spectator within the event. In some embodiments, as previously mentioned, an end user can determine their preferred point of view from the sensor data. For example, consider an environment that has been digitally rendered, digitally modeled in 3D, converted to a point-cloud, or otherwise virtually constructed in a digital form. The environment can be rendered on the user's endpoint device (e.g., computer, VR or MR headsets, etc.) and allow the user to navigate around the virtual version of the environment by guiding a virtual camera about the environment. Still further, an avatar of the user can be inserted into the environment. While the user's avatar can occupy the virtual environment on their own device, it is also possible the user's avatar or presence can be virtually inserted back into the original production product via the production center. This can be achieved via a feedback signal or stream originating from the user's endpoint device back to the production center. The feedback signal can include a location of the user (e.g., coordinates, movements, etc.) within the environment so the production center is able to properly place the user relative to other scene objects. In such cases, the user's avatar, assuming the user decides to make their presence known, will appear in the layers of renderable content on other endpoint devices owned or operated by other users.

Support for virtual spectators can be provided through multiple techniques. As mentioned previously, the environment could have a priori established PoVs to which the spectator can subscribe. Further, the spectator could subscribe to a character's or performer's PoV. In this case, the spectator's device would render the layers of renderable content such that the spectator would see what the performer sees. The prioritization policy can prioritize the streams and layers of renderable content to ensure content relevant to the performer's PoV is rendered first while other content might have lower priorities.

Yet another interesting aspect of the inventive subject matter includes archiving an entire production. The prioritization policy can be considered as outlining what end users might observe from the physical environment. However, the production center has access to all of the data from all of the sensors and can observe the full environment, not just an end user's slice of the environment. Thus, the production center can be configured to store all observed digital sensor data as time series data along with corresponding prioritization policies. Archiving all the data, the production of the event could be remastered at a later time (e.g., upscaling frame rates, upscaling resolution, employ stronger interpolations, etc.). Additionally, this approach provides for other services. For example, a production might be related to a training session (e.g., physical therapy, military training, choreography, rehearsals, etc.). In which case, the production can be played back while observing a live action event in a manner that provides for comparing the training session to the live action version.

What is claimed is:

1. A computer-based broadcast system comprising:
a set of sensors disposed proximal to a physical environment;
at least one non-transitory, computer readable memory storing data; and
at least one processor communicatively coupled with the set of sensors and with the memory, and which performs the following operations upon processing the data:
obtaining a set of sensor data from the set of sensors;
compiling a set of digital data streams, each having a different priority assigned thereto, from the set of sensor data according to a prioritization policy that provides prioritized layer rendering instructions on how each different digital data stream in the set of digital data streams is instantiated in the memory relative to each other based on the different priority assigned thereto and that binds priorities of each digital data stream to how each stream's layer of renderable digital content derived from the set of sensor data is rendered in a layered fashion;
determining, during the compiling, that a conflict exists between two or more digital data streams in the set of digital data streams;
referencing a prioritization policy to resolve the conflict between the two or more digital data streams, wherein the prioritization policy comprises one or more of an object-specific rule and conflict-specific rule by which to resolve the conflict and further indicates which particular object and/or action takes priority and will be included in the compiled set of digital data streams; and
transmitting over a network, according to each stream's different priority assigned thereto, the set of digital data streams to at least one endpoint device such that the at least one endpoint device is enabled to produce an image representing two or more digital data streams from the set of digital data streams by rendering the layer of renderable digital content of each of the two or more digital data streams in the layered fashion based on the priorities bound thereto by the prioritization.

2. The system of claim 1, wherein the physical environment comprises at least one of the following: a stage, a sound stage, a scene, an outdoor setting, a sporting arena, an eSporting arena, a court, a field, and a raceway.

3. The system of claim 1, wherein the set of sensors comprise a heterogeneous mix of sensor types.

4. The system of claim 1, wherein the sensor data comprises at least one real-time sensor feed.

5. The system of claim 4, wherein at least one data stream of the set of data streams comprises a real-time stream representing the at least one real-time sensor feed.

6. The system of claim 1, wherein the layer of renderable content comprises rendering instructions.

7. The system of claim 1, wherein the layer of renderable content comprises a wireframe model having a highest priority as compared to other layers of renderable content associated with other digital data streams in the set of digital data streams.

8. The system of claim 1, wherein the layer of renderable content comprises a polygon model.

9. The system of claim 1, wherein the layer of renderable content comprises digital textures.

10. The system of claim 1, wherein the operations further include storing the prioritization policy in the at least one non-transitory, computer readable memory.

11. The system of claim 1, wherein the prioritization policy comprises rendering parameters of the at least one endpoint device.

12. The system of claim 1, wherein the prioritization policy comprises a subscription level.

13. The system of claim 12, wherein the prioritization of the set of digital data streams depends on the subscription level.

14. The system of claim 13, wherein the prioritization of the prioritized layer rendering instructions depends on the subscription level.

15. The system of claim 12, wherein the subscription level comprises a fee.

16. The system of claim 1, wherein the layers of the renderable content comprises at least two layers, each corresponding to a different digital data stream from the set of digital data streams.

17. The system of claim 1, wherein the layer of renderable content comprises at least one of the following types of digital content: an image, a video, a 3D model, an animation, audio data, haptic data, movie data, and game data.

18. The system of claim 1, wherein the set of sensors include at least two of the following: a microphone, a camera, a laser sensor, a biometric sensor, and a depth sensor.

19. The system of claim 1, wherein the data comprises at least one of an Artificial Neural Network (ANN) and an instruction set.

20. A broadcast method, comprising:
obtaining a set of sensor data from a set of sensors;
compiling a set of digital data streams, each having a different priority assigned thereto, from the set of sensor data according to a prioritization policy that provides prioritized layer rendering instructions on how each different digital data stream in the set of digital data streams is instantiated in the memory relative to each other based on the different priority assigned thereto and that binds priorities of each digital data stream to how each stream's layer of renderable digital content derived from the set of sensor data is rendered in a layered fashion;
determining, during the compiling, that a conflict exists between two or more digital data streams in the set of digital data streams;
referencing a prioritization policy to resolve the conflict between the two or more digital data streams, wherein the prioritization policy comprises one or more of an object-specific rule and conflict-specific rule by which to resolve the conflict and further indicates which particular object and/or action takes priority and will be included in the compiled set of digital data streams; and
transmitting over a network, according to each stream's different priority assigned thereto, the set of digital data streams to at least one endpoint device such that the at least one endpoint device is enabled to produce an image representing two or more digital data streams from the set of digital data streams by rendering the layer of renderable content of each of the two or more digital data streams in the layered fashion based on the priorities bound thereto by the prioritization policy.

\* \* \* \* \*